United States Patent
Hagihara et al.

(10) Patent No.: US 6,734,907 B1
(45) Date of Patent: May 11, 2004

(54) SOLID-STATE IMAGE PICKUP DEVICE WITH INTEGRATION AND AMPLIFICATION

(75) Inventors: Yoshio Hagihara, Amagasaki (JP); Satoshi Nakamura, Ikeda (JP); Kenji Takada, Itami (JP); Shigehiro Miyatake, Osaka (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/285,164

(22) Filed: Apr. 1, 1999

Related U.S. Application Data

(60) Provisional application No. 60/097,644, filed on Aug. 24, 1998.

(30) Foreign Application Priority Data

Apr. 30, 1998 (JP) ............................................. 10/119814

(51) Int. Cl.[7] .............................. H04N 3/14; H04N 5/335
(52) U.S. Cl. ........................................ 348/308; 348/302
(58) Field of Search ................................. 348/302, 307, 348/308, 294

(56) References Cited

U.S. PATENT DOCUMENTS

| | | | | |
|---|---|---|---|---|
| 5,241,575 A | * | 8/1993 | Miyatake et al. ............ 377/60 |
| 5,289,286 A | | 2/1994 | Nakamura et al. .......... 348/223 |
| 5,335,008 A | | 8/1994 | Hamaski ..................... 348/301 |
| 5,488,415 A | * | 1/1996 | Uno ........................... 348/294 |
| 5,576,761 A | | 11/1996 | Iwamoto ..................... 348/257 |
| 5,619,262 A | | 4/1997 | Uno ........................... 348/297 |
| 5,917,547 A | | 6/1999 | Merrill et al. ............... 348/301 |
| 5,933,190 A | | 8/1999 | Dierickx et al. ............ 348/302 |
| 6,011,251 A | | 1/2000 | Dierickx et al. .......... 250/208.1 |
| 6,054,704 A | | 4/2000 | Pritchard et al. ......... 250/208.1 |
| 6,111,242 A | * | 8/2000 | Afghahi ..................... 348/308 |
| 6,111,245 A | * | 8/2000 | Wu et al. ................... 348/308 |
| 6,118,482 A | * | 9/2000 | Clark et al. ................ 348/308 |
| 6,130,713 A | | 10/2000 | Merrill ....................... 348/308 |
| 6,201,572 B1 | * | 3/2001 | Chou ......................... 348/308 |
| 6,239,839 B1 | * | 5/2001 | Matsunaga et al. ........ 348/308 |
| 6,355,965 B1 | * | 3/2002 | He et al. .................... 348/302 |
| 6,512,544 B1 | * | 1/2003 | Merrill et al. .............. 348/302 |
| 2002/0154231 A1 | | 10/2002 | Decker et al. ............. 348/302 |

* cited by examiner

Primary Examiner—Wendy R. Garber
Assistant Examiner—Jacqueline Wilson
(74) Attorney, Agent, or Firm—Sidley Austin Brown & Wood LLP

(57) ABSTRACT

A solid-state, two-dimensional image sensing device having a matrix of pixels each of which employs a photosensor that generates a photocurrent and a MOS circuit which outputs a signal proportional to the logarithm of the integral over time of the photocurrent. The sensor includes an integration control switching device so that all pixels in the array have equal integration time. The sensor integrates the signal for each pixel for a period of time and stores the integrated signal in a pixel signal storage location. To read out the stored signal each pixel includes an amplifier to increase the signal during read out. The sensor further accumulates signal in either a MOS transistor pn-junction or a secondary pixel storage location during a time that the integrated pixel signal is being read out so that image information can be collected continuously even while the integrated pixel signal for each pixel is being read.

18 Claims, 13 Drawing Sheets

SOLID-STATE IMAGE PICKUP DEVICE WITH INTEGRATION AND AMPLIFICATION

RELATED APPLICATIONS

This application is based on Japanese Patent Application No. 10-119814, the entire contents of which is incorporated herein by reference. This application claims the benefit of prior filed copending U.S. Provisional Application No. 60/097,644 filed Aug. 24, 1998.

FIELD OF THE INVENTION

The present invention relates to a solid-state image pickup device and, more particularly, to a solid-state image pickup device comprising pixels arranged in two dimensions.

BACKGROUND OF THE INVENTION

A two-dimensional solid-state image pickup device in which pixels each including a photoelectric converting element such as a photodiode and means for drawing out photoelectric charges generated in the photoelectric converting element onto an output signal line are arranged to form a matrix (with rows and columns) has had a wide variety of applications. Such solid-state image pickup devices can be subdivided into a CCD type and a MOS type depending on the means for reading out (drawing out) the photoelectric charges generated in the photoelectric converting element. A CCD image pickup device has the drawback of a narrow dynamic range due to the photoelectric charges which are transferred while being accumulated in potential wells. In a MOS image pickup device, on the other hand, charges accumulated in the pn junction capacitance of a photodiode are read out via a MOS transistor.

Referring to. FIG. 24, the structure of each pixel in a conventional MOS solid-state image pickup device will be described. In the drawing, a photodiode PD has a cathode connected to the gate of a MOS transistor T1 and to the drain of a MOS transistor T2. The MOS transistor T1 has a source connected to the drain of a MOS transistor T3 which has a source connected to an output signal line Vout. A direct-current voltage VDD is applied to the drain of the MOS transistor T1, while a direct-current voltage Vss is applied to the source of the MOS transistor T2 and to the anode of the photodiode.

When the photodiode PD is irradiated with light, photoelectric charges are generated and accumulated at the gate of the MOS transistor T1. When the MOS transistor T3 is turned ON with the application of a pulse to the gate thereof, an electric current proportional to the charges at the gate of the MOS transistor T1 is led out onto the output signal line through the MOS transistors T1 and T3, whereby an output current proportional to the quantity of incident light is read out. After the reading of a signal, the MOS transistor T3 is turned OFF and the MOS transistor T2 is turned ON, which initializes the gate voltage of the MOS transistor T1.

Thus, in the conventional MOS solid-state image pickup device, the photoelectric charge generated in the photodiode and accumulated at the gate of the MOS transistor are read from each of the pixels without any alterations thereto so that the output signal has a narrow dynamic range and contains a variable component and noise component of light from the power source. Moreover, since the output signal is on a low level, the conventional MOS image pickup device is disadvantageous in that the S/N ratio is low and a high-quality image pickup signal cannot be obtained therefrom.

It is therefore an object of the present invention, to provide a solid-state image pickup device capable of producing a high output from a pixel. Another object of the present invention is to provide a solid-state image pickup device capable of generating an image pickup signal with an excellent S/N ratio. Still another object of the present invention is to provide a solid-state image pickup device with a wide dynamic range.

SUMMARY OF THE INVENTION

These and other objects of the present invention are achieved by a two-dimensional solid-state image pickup device having a plurality of pixels arranged to form a matrix, each of the pixels comprising: photoelectric converting means; a capacitor for integrating an output signal from the photoelectric converting means; an amplifier for amplifying the voltage of an output from the capacitor; and a lead-out path for leading out the amplified voltage onto an output signal line.

In this arrangement, the output signal from the photoelectric converting means is integrated in the capacitor so that the variable component and high frequency noise of light from the light source contained in the output signal is absorbed in the capacitor and removed from the output signal. The output signal from the photoelectric converting means from which the variable component and high frequency noise have been removed is further voltage-amplified by the amplifier to have a sufficient magnitude and then outputted, resulting in an image pickup signal with excellent sensitivity. Moreover, since each pixel is provided with the photoelectric converting means, the capacitor, the amplifier, and the lead-out means, a signal can be read more stably and more accurately.

The objects of the present invention may also be achieved by a two-dimensional solid-state image pickup device having a plurality of pixels arranged to form a matrix, each of the pixels comprising: a photoelectric converting element; logarithmic converting means for changing an output current from the photoelectric converting element into a logarithmically converted voltage; a transistor having a first electrode, a second electrode, and a control electrode, the output voltage from the logarithmic converting means being applied to the control electrode; a capacitor having one terminal connected to receive an output current from the second electrode of the transistor; an amplifier for amplifying the voltage of an output from the capacitor; and a lead-out path for leading out the amplified voltage onto an output signal line.

In this arrangement, the output signal from the photoelectric converting means is integrated in the capacitor so that the variable component and high frequency noise of light from the light source contained in the output signal is absorbed in the capacitor and removed from the output signal. The output signal from the photoelectric converting means from which the varying component and high frequency noise have been removed is further voltage-amplified by the amplifier to have a sufficient magnitude and then outputted, resulting in an image pickup signal with excellent sensitivity. Moreover, logarithmic compression conversion achieves a wider dynamic range in the solid-state image pickup device in the arrangement.

The amplifier may include: an amplifier transistor having a first electrode, a second electrode, and a control electrode to which the output from the capacitor is applied; and a load resistor connected to an output line leading to the second electrode of the amplifier transistor. The load resistor may be used in common by several pixels. Hence, the load resistors may be smaller in total number than the pixels. In the case of using the amplifier transistor the lead-out path is appropriately connected to the second electrode of the amplifier transistor such that a signal is led out from the second electrode.

A transistor having a first electrode connected to the second electrode of the amplifier transistor, a second electrode connected to a direct-current voltage, and a control electrode connected to a direct-current voltage may be used as the load resistor (hereinafter referred to as "resistor transistor"). Additionally, a MOS transistor may be used as the amplifier transistor. In the case of using an n-channel MOS transistor the direct-current voltage applied to the first electrode of the amplifier transistor is properly set lower in potential than the direct-current voltage connected to the second electrode of the resistor transistor.

In the case of using a p-channel MOS transistor as the amplifier transistor, the direct-current voltage applied to the first electrode of the amplifier transistor is properly set higher in potential than the direct-current voltage connected to the second electrode of the resistor transistor. The lead-out path to be used may include a switch for sequentially selecting a specified one of all the pixels and leading out the amplified voltage from the selected pixel onto the output signal line.

The present invention also includes the provision of a second capacitor for performing signal integration while the output from the first capacitor is being led out. Thus, the second capacitor enables signal integration in the second capacitor simultaneously with the reading of the signal from the first capacitor and thereby provides compatibility with the shooting of a dynamic picture.

The present invention also contemplates that the current input path to the capacitor is provided with a switch to be controlled simultaneously in each of the pixels so that the signal integration time for each of the pixels will be equal. Thus, there is no time lag between the reading of charges accumulated in the capacitors in one column and the reading of charges accumulated in the capacitors in another column so that the integration time in the capacitor (as well as the timing for integration) is equal in each of the pixels. Consequently, signals are free from any error due to a time lag between the reading of the signal from one pixel and the reading of the signal from another pixel.

The objects of the present invention may also be achieved by a two-dimensional solid-state image pickup device having a plurality of pixels arranged to form a matrix, each of the pixels comprising: a photodiode; a first MOS transistor having a first electrode and a gate electrode each connected to one electrode of the photodiode, the first MOS transistor operating in a subthreshold region; a second MOS transistor having a gate electrode connected to the gate electrode of the first MOS transistor and a first electrode connected to a direct-current voltage, the second MOS transistor operating in the subthreshold region; a capacitor having one terminal connected to a second electrode of the second MOS transistor and the other terminal connected to a direct-current voltage, the capacitor integrating a signal based on photoelectric charges generated in the photodiode; a third MOS transistor having a gate electrode connected to the one terminal of the capacitor and a first electrode connected to a direct-current voltage, the third MOS transistor operating as an amplifier; a fourth MOS transistor having a first electrode connected to the one terminal of the capacitor and a second electrode connected to a direct-current voltage, the fourth MOS transistor being turned ON in response to a reset signal inputted to a gate electrode thereof to reset the capacitor to an initial state; and a fifth MOS transistor for read operation having a first electrode connected to a second electrode of the third MOS transistor, a second electrode connected to an output signal line, and a gate electrode connected to a column select line.

In this arrangement, the photoelectric current that is generated in the photodiode is logarithmically converted in the first MOS transistor so that the gate voltage of the first MOS transistor becomes proportional to the photocurrent through the logarithmic conversion. The capacitor is then charged with the gate voltage through the second MOS transistor. At the completion of integration, the fifth MOS transistor is turned ON and the output based on charges in the capacitor is voltage-amplified by the third MOS transistor and led out onto the output signal line. After the capacitor voltage is read out onto the output signal line, a reset pulse is applied to the gate of the fourth MOS transistor and the voltage on the capacitor is initialized so that integration of a signal in the capacitor can be initiated again.

The objects of the present invention may also be achieved by a two-dimensional solid-state image pickup device having a plurality of pixels arranged to form a matrix, each of the pixels comprising: a photodiode; a first MOS transistor having a first electrode and a gate electrode each connected to one electrode of the photodiode, the first MOS transistor operating in a subthreshold region; a second MOS transistor having a gate electrode connected to the gate electrode of the first MOS transistor, the second MOS transistor operating in the subthreshold region; a capacitor having one terminal connected to a second electrode of the second MOS transistor and the other terminal connected to a direct-current voltage, the capacitor being reset via the second MOS transistor when a reset voltage is applied to a first electrode of the second MOS transistor; a third MOS transistor having a gate electrode connected to the one terminal of the capacitor and a first electrode connected to a direct-current voltage, the third MOS transistor operating as an amplifier; and a fifth MOS transistor for selecting a read operation having a first electrode connected to a second electrode of the third MOS transistor, a second electrode connected to an output signal line and a gate electrode connected to a column select line.

In this arrangement, the integration in the capacitor and the reading of the voltage from the capacitor are performed similarly to the foregoing case. However, the resetting of the capacitor is performed by releasing the charges from the capacitor through the second MOS transistor when the reset voltage is applied to the first electrode of the second MOS transistor.

The objects of the present invention may also be achieved by a two-dimensional solid-state image pickup device comprising pixels arranged to form a matrix, each of the pixels comprising: a photodiode; a first MOS transistor having a first electrode and a gate electrode each connected to one electrode of the photodiode, the first MOS transistor operating in a subthreshold region; a second MOS transistor having a gate electrode connected to the gate electrode of the first MOS transistor and a first electrode connected to a direct-current voltage, the second MOS transistor operating in the subthreshold region; a capacitor having one terminal connected to a second electrode of the second MOS transistor and the other terminal connected to a direct-current voltage, the capacitor integrating a signal based on photoelectric charges generated in the photodiode; a third MOS transistor having a gate electrode connected to the one terminal of the capacitor and a first electrode connected to a direct-current voltage, the third MOS transistor operating as an amplifier; a fourth MOS transistor having a first electrode connected to the one terminal of the capacitor and a second electrode connected to a direct-current voltage, the fourth MOS transistor being constantly in the ON state with a direct-current voltage applied to a gate electrode thereof; and a fifth MOS transistor for selecting a read operation having a first electrode connected to a second electrode of the third MOS transistor, a second electrode connected to an output signal line, and a gate electrode connected to a column select line.

In this arrangement, the fourth MOS transistor that is constantly in the ON state is equivalent to a resistor so that a resistor having a specified value is connected to the capacitor. Accordingly, the initial value of the capacitor is determined by the resistor. In other words, the initial value on the capacitor can be adjusted by varying the direct-current voltage applied to the gate electrode of the fourth MOS transistor.

The objects of the present invention may also be achieved by a two-dimensional solid-state image pickup device comprising pixels arranged to form a matrix, each of the pixels comprising: a photodiode; a first MOS transistor having a first electrode and a gate electrode each connected to one electrode of the photodiode, the first MOS transistor operating in a subthreshold region; a second MOS transistor having a gate electrode connected to the gate electrode of the first MOS transistor and a first electrode connected to a direct-current voltage, the second MOS transistor operating in the subthreshold region; a sixth MOS transistor having a first electrode connected to a second electrode of the second MOS transistor and a gate electrode to which a switching voltage is applied; a capacitor having one terminal connected to a second electrode of the sixth MOS transistor and the other terminal connected to a direct-current voltage, the capacitor integrating a signal based on a photoelectric current generated in the photodiode; a third MOS transistor having a gate electrode connected to the one terminal of the capacitor and a first electrode connected to a direct-current voltage, the third MOS transistor operating as an amplifier; a fourth MOS transistor having a first electrode connected to the one terminal of the capacitor and a second electrode connected to a direct-current voltage, the fourth MOS transistor being turned ON in response to a reset signal inputted to a gate electrode thereof to reset the capacitor to an initial state; and a fifth MOS transistor for selecting a read operation having a first electrode connected to a second electrode of the third MOS transistor, a second electrode connected to an output signal line and a gate electrode connected to a column select line, wherein a voltage on the capacitor is amplified by the third MOS transistor and read out after halting integration in the capacitor by turning OFF the sixth MOS transistor.

In this arrangement, the integration time in each of the pixels is equalized by simultaneously controlling the sixth MOS transistor of each of the pixels.

The objects of the present invention may also be achieved by a two-dimensional solid-state image pickup device having a plurality of pixels arranged to form a matrix, each of the pixels comprising: a photodiode; a first MOS transistor having a first electrode and a gate electrode each connected to one electrode of the photodiode, the first MOS transistor operating in a subthreshold region; a second MOS transistor having a gate electrode connected to the gate electrode of the first MOS transistor and a first electrode to which a clock is applied, the second MOS transistor operating in the subthreshold region; a capacitor having one terminal connected to a second electrode of the second MOS transistor via a first switch and the other terminal connected to a direct-current voltage, the capacitor integrating a signal based on a photoelectric current generated in the photodiode; a third MOS transistor having a gate electrode connected to the one terminal of the capacitor and a first electrode connected to a direct-current voltage, the third MOS transistor operating as an amplifier; and a second switch having one terminal connected to a second electrode of the third MOS transistor and the other terminal connected to an output signal line, wherein the first switch is turned ON to supply an output current from the second MOS transistor to the capacitor and thereby integrate the signal, the second switch is turned ON after the first switch is turned OFF to amplify the voltage of the signal from the capacitor by means of the third MOS transistor and lead out the signal at the amplified voltage onto the output signal line, and then the first switch is turned ON, and the second switch is turned OFF, to initialize the capacitor through the second MOS transistor and the first switch during the period during which the clock applied to the first electrode of the second MOS transistor is at a reset voltage.

In this arrangement, the capacitor is initialized (reset) by releasing a charge from the capacitor through the first switch and the second MOS transistor.

The objects of the present invention may also be achieved by a two-dimensional solid-state image pickup device having a plurality of pixels arranged to form a matrix, each of the pixels comprising: a photodiode; a first MOS transistor having a first electrode and a gate electrode each connected to one electrode of the photodiode, the first MOS transistor operating in a subthreshold region; a second MOS transistor having a gate electrode connected to the gate electrode of the first MOS transistor and a first electrode to which a clock is applied, the second MOS transistor operating in the subthreshold region; a capacitor having one terminal connected to a second electrode of the second MOS transistor via a first switch and the other terminal connected to a direct-current voltage, the capacitor integrating a signal based on a photoelectric current generated in the photodiode; a third MOS transistor having a gate electrode connected to the one terminal of the capacitor and a first electrode connected to a direct-current voltage, the third MOS transistor operating as an amplifier; a fourth MOS transistor having one electrode connected to the one terminal of the capacitor, the other electrode connected to a direct-current voltage and a gate electrode for receiving a reset signal; and a second switch having one terminal connected to a second electrode of the third MOS transistor and the other terminal connected to an output signal line, wherein a pn junction capacitance related to a second electrode of the second MOS transistor is reset during a period during which a clock applied to the second electrode of the second MOS transistor is on a reset-voltage level while the voltage of the signal from the capacitor is amplified by the third MOS transistor and read onto the output signal line by turning OFF the and read onto the output signal line by turning OFF the first switch, integration of the signal in the pn junction capacitance is initiated during the period during which the clock is on the other level, and the first switch is turned ON after the reading of the signal from the capacitor is completed to transfer charges accumulated in the pn junction capacitance to the capacitor and continue integration in the capacitor.

The objects of the present invention may also be achieved by a two-dimensional solid-state image pickup device having a plurality of pixels arranged to form a matrix, each of the pixels comprising: a photodiode; a first MOS transistor having a first electrode and a gate electrode each connected to one electrode of the photodiode, the first MOS transistor operating in a subthreshold region; a second MOS transistor having a gate electrode connected to the gate electrode of the first MOS transistor and a first electrode to which a direct-current voltage is applied, the second MOS transistor operating in the subthreshold region; a first capacitor having one terminal connected to a second electrode of the second MOS transistor and the other terminal connected to a direct-current voltage, the first capacitor integrating a signal based on a photoelectric current generated in the photodiode; a first switch having one terminal connected to the one terminal of the first capacitor; a second capacitor having one terminal connected to the other terminal of the first switch and the other terminal connected to a direct-current voltage; a third MOS transistor having a gate electrode connected to the one terminal of the second capacitor and a first electrode connected to a direct-current voltage, the third MOS transistor operating as an amplifier; a fourth MOS transistor having a first electrode connected to the one terminal of the second capacitor, a second electrode connected to a direct-current voltage, and a gate electrode for receiving a reset signal; and a second switch having one terminal connected to a second electrode of the third MOS transistor and the other terminal connected to an output signal line, wherein a subsequent integration is initiated in the first capacitor while the voltage of a signal from the second capacitor is amplified by the third MOS transistor and read onto the output signal line by turning OFF the first switch, the fourth MOS transistor is turned ON to reset the second capacitor after the completion of the read operation, and then the first switch is turned ON to transfer charges from the first capacitor to the second capacitor and continue integration in the second capacitor.

The objects of the present invention may also be achieved by a two-dimensional solid-state image pickup device comprising pixels arranged to form a matrix, each of the pixels comprising: a photodiode; a first MOS transistor having a first electrode and a gate electrode each connected to one electrode of the photodiode, the first MOS transistor operating in a subthreshold region; a second MOS transistor having a gate electrode connected to the gate electrode of the first MOS transistor and a first electrode to which a clock is applied, the second MOS transistor operating in the subthreshold region; a first capacitor having one terminal connected to a second electrode of the second MOS transistor and the other terminal connected to a direct-current voltage, the first capacitor integrating a signal based on a photoelectric current generated in the photodiode; a first switch having one terminal connected to the one terminal of the first capacitor; a second capacitor having one terminal connected to the other terminal of the first switch and the other terminal connected to a direct-current voltage; a third MOS transistor having a gate electrode connected to the one terminal of the second capacitor and a first electrode connected to a direct-current voltage, the third MOS transistor operating as an amplifier; and a second switch having one terminal connected to a second electrode of the third MOS transistor and the other terminal connected to an output signal line, wherein the voltage integrated in the first capacitor is transferred to the second capacitor by turning ON the first switch to reset the first capacitor and then the subsequent integration is performed in the first capacitor while the voltage based on the charges in the second capacitor is amplified by the third MOS transistor and read onto the output signal line by turning OFF the first switch.

The objects of the present invention may also be achieved by a two-dimensional solid-state image pickup device having a plurality of pixels arranged to form a matrix, each of the pixels comprising: a photodiode; a first MOS transistor having a first electrode and a gate electrode each connected to one electrode of the photodiode, the first MOS transistor operating in a subthreshold region; a second MOS transistor having a gate electrode connected to the gate electrode of the first MOS transistor and a first electrode to which a clock is applied, the second MOS transistor operating in the subthreshold region; a first capacitor having one terminal connected to a second electrode of the second MOS transistor and the other terminal connected to a direct-current voltage, the first capacitor integrating a signal based on a photoelectric current generated in the photodiode; a first switch having one terminal connected to the one terminal of the first capacitor; a second capacitor having one terminal connected to the other terminal of the first switch and the other terminal connected to a direct-current voltage; a third MOS transistor having a gate electrode connected to the one terminal of the second capacitor and a first electrode connected to a direct-current voltage, the third MOS transistor operating as an amplifier; a fourth MOS transistor having a first electrode connected to the one terminal of the second capacitor, a second electrode connected to a direct-current voltage and a gate electrode to which a reset voltage is applied; and a second switch having one terminal connected to a second electrode of the third MOS transistor and the other terminal connected to an output signal line, wherein the first capacitor is reset during a period during which the clock applied to the second electrode of the second MOS transistor is on a reset-voltage level while the voltage of a signal from the second capacitor is amplified by the third MOS transistor by turning OFF the first switch, integration in the first capacitor is initiated during the period during which the clock is on the other level, the fourth MOS transistor is turned ON to reset the second capacitor after the completion of read operation, and then the first switch is turned ON to transfer charges from the first capacitor to the second capacitor and continue the integration in the second capacitor.

The objects of the present invention may also be achieved by the solid-state image pickup device previously described, further comprising MOS transistors connected to the individual pixels, each of the MOS transistors being connected to the corresponding pixel via the output signal line to serve as a load resistor to the third MOS transistor on the drain side of the third MOS transistor.

The MOS resistor transistors may further be provided for the individual rows forming the matrix of the pixels, each of the resistor MOS transistors having a first electrode connected to the fifth MOS transistor or second switch of each of the pixels arranged in the corresponding row, a second electrode connected to a direct-current voltage, and a gate electrode connected to a direct-current voltage.

BRIEF DESCRIPTION OF THE DRAWINGS

A more complete understanding of the present invention and its advantages will be readily apparent from the following Detailed Description taken in conjunction with the accompanying drawings. Throughout the accompanying drawings, like parts are designated by like reference numbers wherein.

Figure 1:
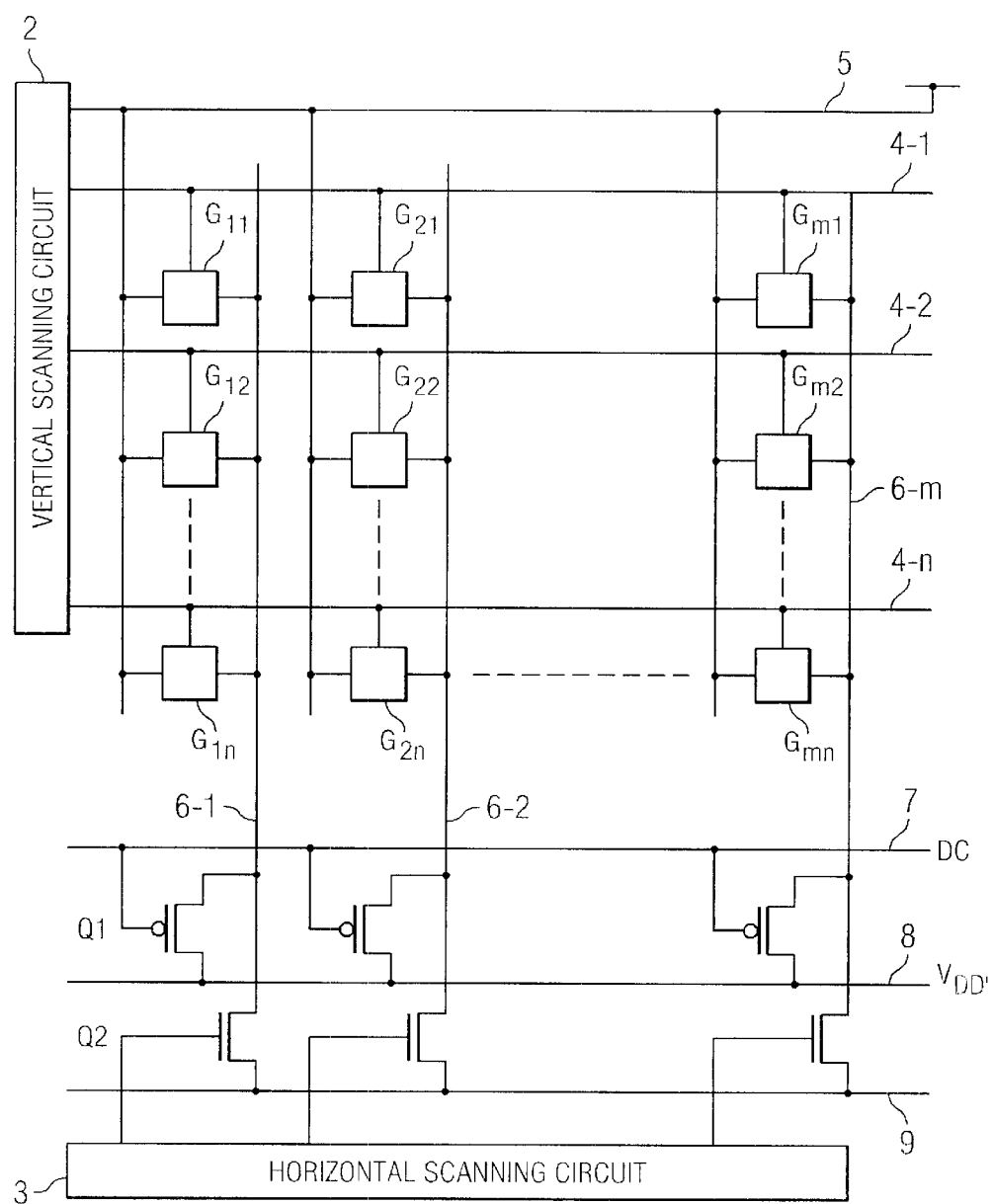
FIG. 1 is a block circuit diagram for illustrating the entire structure of a two-dimensional solid-state image pickup device according to an embodiment of the present invention in which an active element in each pixel is composed of an n-channel MOS transistor.

In the various figures, the reference numerals have the following meanings:

| | |
|---|---|
| G11 to Gmn | pixels |
| 2 | vertical scanning circuit |
| 3 | horizontal scanning circuit |
| 4-1, 4-2 | column select lines |
| 6-1, 6-2 | output signal lines |
| PD | photodiode |
| T1 to T6 | first to sixth MOS transistors |
| C | capacitor |
| C1, C2 | first and second capacitors |
| Cs | pn junction capacitance |

DETAILED DESCRIPTION OF THE PREFERRED EMBODIMENTS

Figure 3:
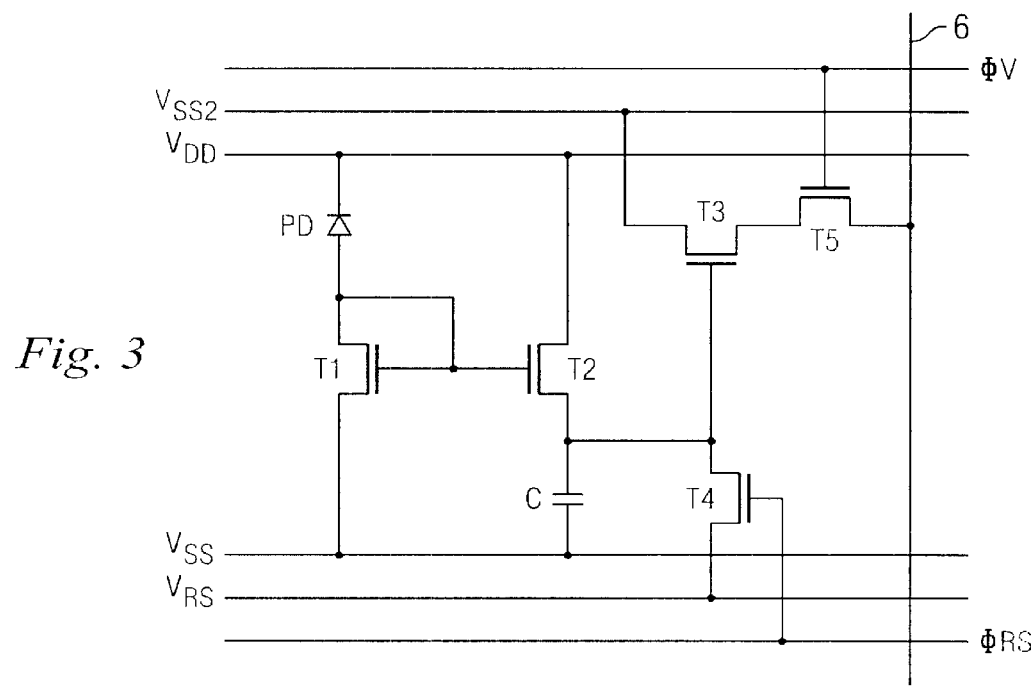
FIG. 3 is a circuit diagram showing the structure of each pixel according to a first embodiment of the present invention.

Referring now to the drawings, the individual embodiments of a solid-state image pickup device according to the present invention will be described. FIG. 1 schematically shows a part of the two-dimensional MOS solid-state image pickup device embodying the present invention. In the drawing, reference numerals G11, G12, . . . Gmn denote pixels arranged in rows and columns (m×n rows and column in a matrix arrangement), 2 denotes a vertical scanning circuit for sequentially scanning columns (lines) 4-1, 4-2, . . . 4-n, 3 denotes a horizontal scanning circuit for horizontally sequentially reading photoelectric conversion signals led out from the individual pixels onto output signal lines 6-1, 6-2, . . . 6-m on a pixel-by-pixel basis, and 5 denotes a power-source line. Although the individual pixels are connected not only to the foregoing lines 4-1, 4-2, . . . 4-n and output signal lines 6-1, 6-2, . . . 6-m but also to other lines (e.g., a clock line, a bias supply line, and the like), the depiction of the other lines is omitted in FIG. 1 for clarity. These other lines are shown in FIG. 3 and the subsequent drawings illustrating the individual embodiments.

As shown in FIG. 1, each of the output lines (6-1, 6-2, . . . 6-m) is provided with a pair of MOS transistors: Q1, a p-channel MOS transistor; and Q2, an n-channel MOS transistor. The MOS transistor Q1 has a gate connected to a direct-current voltage line 7, a drain connected to an output signal line 6-1, and a source connected to a direct- current power-source line 8. On the other hand, the MOS transistor Q2 has a drain connected to the output signal line 6-1, a source connected to a final signal line 9, and a gate connected to the horizontal scanning circuit 3.

Figure 2:
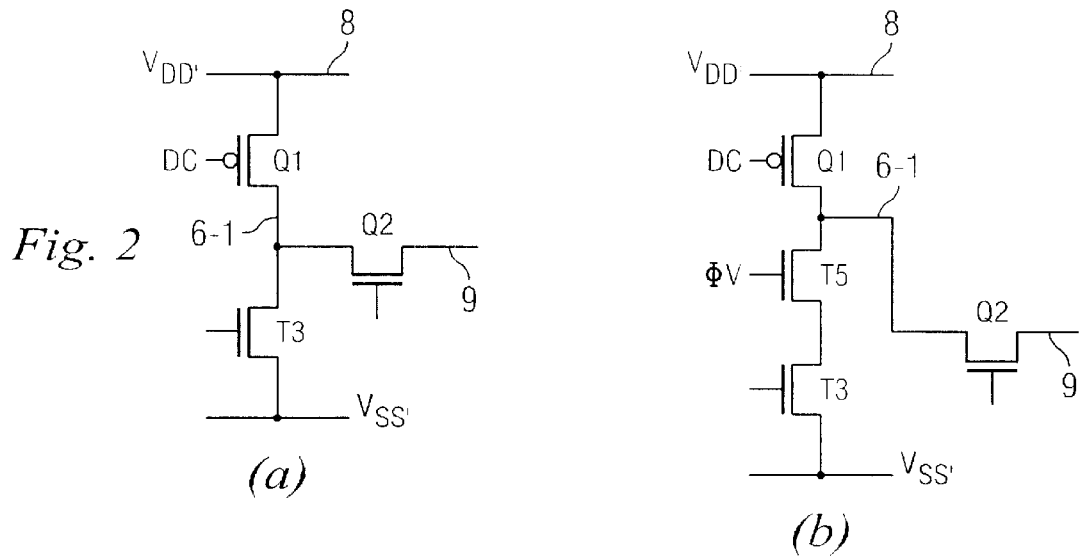
FIGS. 2(a)–2(b) are circuit diagrams each showing a part of the image pickup device of FIG. 1.

As will be described and illustrated later, each of the pixels G11 to Gmn is provided with a third MOS transistor T3 as an amplifier for amplifying a voltage resulting from photoelectric charges generated in the pixel and outputting the amplified voltage. The connecting relationship between the amplifier MOS transistor T3 and the MOS transistor Q1 is as shown in FIG. 2(a). Here, the relationship between the direct-current voltage VDD' connected to the source of the MOS transistor Q1 and the direct-current voltage VSS' connected to the source of the third MOS transistor T3 is expressed as VDD'>VSS', where the direct-current voltage VSS' is, e.g., a ground voltage (grounding). In this circuit structure, a signal is inputted to the gate of the lower-stage MOS transistor T3 and the direct-current voltage is constantly applied to the gate of the upper-stage MOS transistor Q1. Consequently, the upper-stage MOS transistor Q1 is equivalent to a resistor (load resistor) and the circuit shown in FIG. 2(*a*) serves as a source-grounded amplifier circuit. In this case, it may be considered that the gate voltage is amplified and outputted from the drain side of the MOS transistor T3.

The MOS transistor Q2 is controlled by the horizontal scanning circuit 3 to operate as a switching element. It is to be noted that a fifth MOS transistor T5 for switching is also provided in each of the pixels according to each of the embodiments, as will be described later. If the circuit shown in FIG. 2(*a*) is depicted more completely in conjunction with the fifth MOS transistor T5, the circuit shown in FIG. 2(*b*)is obtained. Specifically, a fifth MOS transistor is interposed between the MOS transistor Q1 and the third MOS transistor T3. The fifth MOS transistor T5 is for selecting among columns, while the transistor Q2 is for selecting among rows. The structure shown in FIGS. 1 and 2 is common to the first to ninth embodiments which will be described below. In any of the embodiments, the structure of the voltage amplifier circuit as shown in FIG. 2 allows a signal with increased gain to be outputted.

In the case of logarithmically converting a photoelectric current for an enlarged dynamic range, an output signal from each of the pixels is small without any alterations thereto. However, since the present amplifier circuit amplifies the output signal to provide a sufficiently large signal, processing to be performed by the subsequent signal processor circuit (i.e., a circuit to which the image pickup device is connected but which is not shown here) is facilitated. Moreover, since the transistor Q1 composing the load resistor portion of the amplifier circuit is provided for each of the output signal lines 6-1, 6-2, . . . 6-m to which the plurality of pixels arranged in rows are connected, and not within each of the pixels, the number of load resistors can be reduced, which reduces the area occupied by the amplifier circuits on a semiconductor chip.

Next, a description will be given to each of the embodiments by referring to the structure of each pixel portion. Although a signal is amplified by the third MOS transistor T3 and led out onto the output signal line in the following descriptions of the embodiments, it should be appreciated that, more precisely, although MOS transistor Q1 is not illustrated in the circuit corresponding to each pixel portion, the voltage of the pixel signal is amplified by the combination of the third MOS transistor T3 and the MOS transistor Q1 (acting as the load resistor). It is to be noted that the expression "connection to a direct-current voltage" used in the present specification includes connection to a ground voltage, i.e., "grounding."

First Embodiment

As shown in FIG. 3, a pn photodiode forms a photosensitive element (photoelectric converting element). The photodiode PD has an anode connected to the drain and gate of a first MOS transistor T1 and to the gate of a second MOS transistor T2. The second MOS transistor T2 has a source connected to the gate of a third MOS transistor T3 and to the drain of a fourth MOS transistor T4. A direct-current voltage Vss2, such as a ground voltage, is applied to the drain of the third MOS transistor T3. The third MOS transistor T3 has a source connected to the drain of a fifth MOS transistor T5. The fifth MOS transistor T5 has a source connected to an output signal line 6.

A direct-current voltage VDD is applied to the cathode of the pn photodiode PD and to the drain of the second MOS transistor T2. On the other hand, a direct-current voltage Vss is applied to the source of the first MOS transistor T1, and to the source of the second MOS transistor T2 via a capacitor (C). A direct-current voltage VRS is applied to the source of a fourth MOS transistor T4. A reset voltage $\Phi$RS is applied to the gate of the fourth MOS transistor T4. Each of the first and second MOS transistors T1 and T2 is biased to operate in a subthreshold region.

When light is incident upon the photodiode PD, a photoelectric current is generated and a voltage having a value obtained by logarithmically converting the photoelectric current is generated at the gate of the first MOS transistor T1 in accordance with the subthreshold characteristic of the MOS transistor. As a result of this voltage, a charge equivalent to a value obtained by logarithmically converting the integral of the photoelectric current is accumulated in the capacitor C. When a pulse $\Phi$V is supplied to the gate of the fifth MOS transistor T5 to turn MOS transistor T5 ON, a current proportional to the charge accumulated at the gate of the third MOS transistor T3 is allowed to pass through the third and fifth MOS transistors T3 and T5, while being voltage-amplified by the third MOS transistor T3, and led out onto the output signal line 6, whereby a signal (output voltage) proportional to the logarithm of the quantity of incident light is read out. After the reading of the signal, the voltage on the capacitor C and the gate voltage of the third MOS transistor T3 can be initialized by turning OFF the fifth MOS transistor T5 and turning ON the fourth MOS transistor 4.

Second Embodiment

Figure 4:
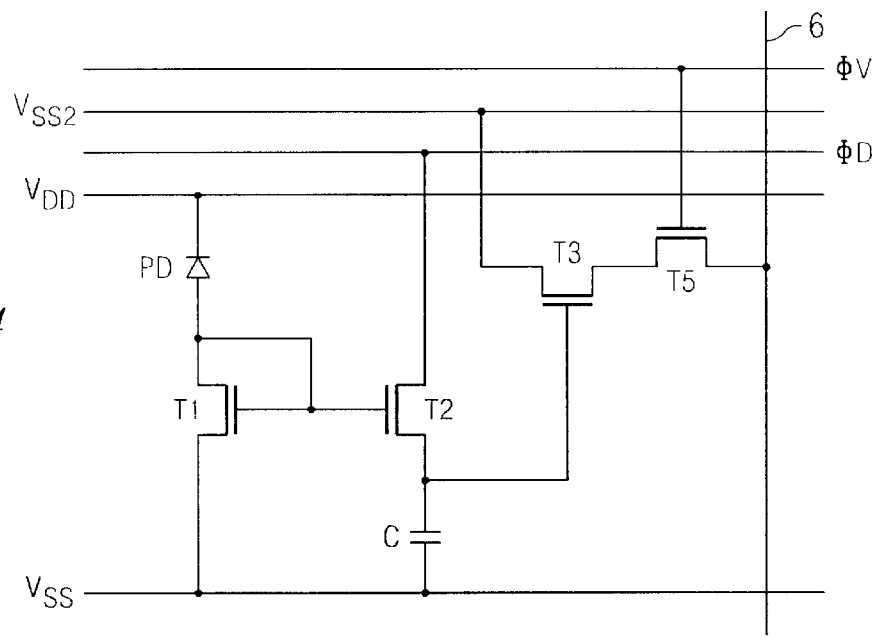
FIG. 4 is a circuit diagram showing the structure of each pixel according to a second embodiment of the present invention.

As shown in FIG. 4, a second embodiment of the present invention is constructed so as to reset (initialize) the voltage on the capacitor C and the gate voltage of the third MOS-transistor T3 by supplying a clock $\Phi$D to the drain of the second MOS transistor T2 in the absence of the fourth MOS transistor T4. The other components in the second embodiment are the same as in the first embodiment (FIG. 3). During the period where the clock $\Phi$D is at a HIGH level, integration in the capacitor C is performed. During the period during which the clock $\Phi$D is on the LOW level, charges are released from the capacitor C and from the gate of the third MOS transistor through the MOS transistor T2 so that the voltage on the capacitor C and the gate voltage of the third MOS transistor T3 is initialized (reset) to a value approximate to the LOW level of the clock $\Phi$D. Since the fourth MOS transistor T4 is not provided in the second embodiment, the structure thereof is simplified accordingly.

Third Embodiment

Figure 5:
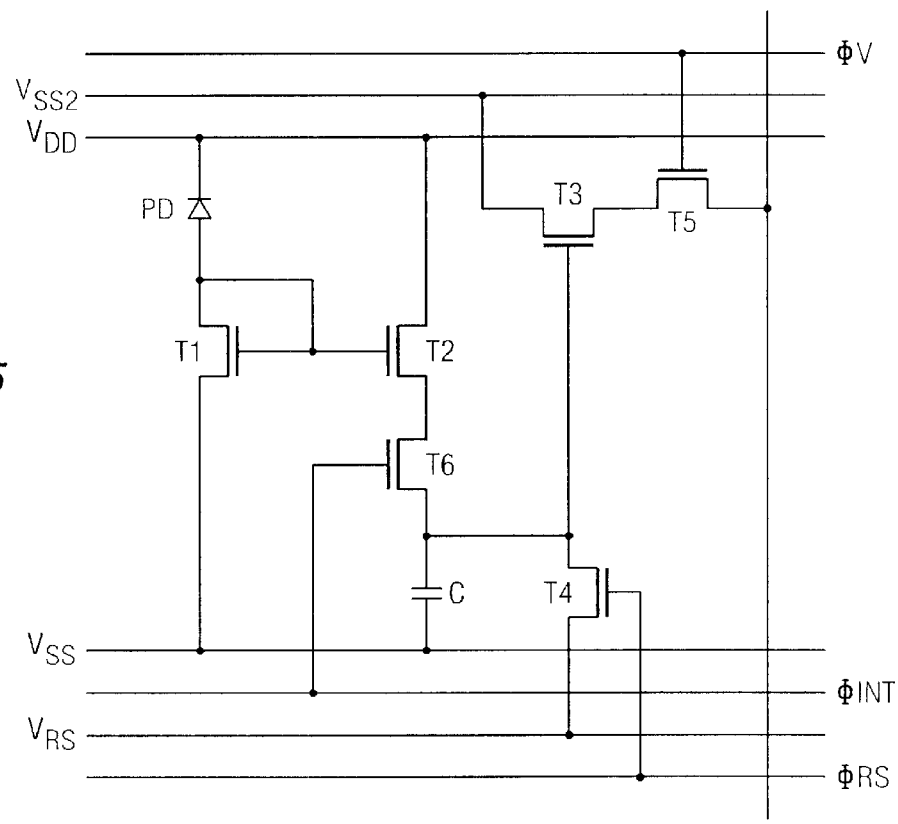
FIG. 5 is a circuit diagram showing the structure of each pixel according to a third embodiment of the present invention.

As shown in FIG. 5, a third embodiment of the present invention is characterized in that an n-channel sixth MOS transistor T6 is interposed as a switch between the second MOS transistor T2 and the capacitor C, which is different from the first embodiment (FIG. 3). The sixth MOS transistor T6 has a drain connected to the source of the second MOS transistor T2, a source connected to the capacitor C, and a gate to which an integration-time control voltage (switching voltage) $\Phi$INT is applied. An integrating operation for the capacitor C is performed when the integration-time control voltage $\Phi$INT is at a HIGH level with the sixth MOS transistor T6 being in the ON state. To read a signal from the capacitor C, the fifth MOS transistor T5 is turned ON with the integration-time control voltage $\Phi$INT being at the LOW level and with the sixth MOS transistor T6 being in the OFF state so that the signal is allowed to pass through the third and fifth MOS transistors T3 and T5, while being voltage-amplified by the third MOS transistor T3, and read onto the output signal line 6.

After the reading of the signal, the fourth MOS transistor T4 is turned ON with the fifth MOS transistor T5 and the sixth MOS transistor T6 being in the OFF state so as to reset (initialize) the voltage on the capacitor C and the gate voltage of the third MOS transistor T3. Thereafter, the sixth MOS transistor T6 is turned ON to perform the subsequent integration in the capacitor C. In the third embodiment, if the integration-time control voltage ΦINT is supplied simultaneously for an equal period to the gate of the sixth MOS transistor T6 of each of the pixels arranged in two dimensions, the charges simultaneously accumulated in the capacitors C of the individual pixels can be integrated for equal periods.

Fourth Embodiment

Figure 6:
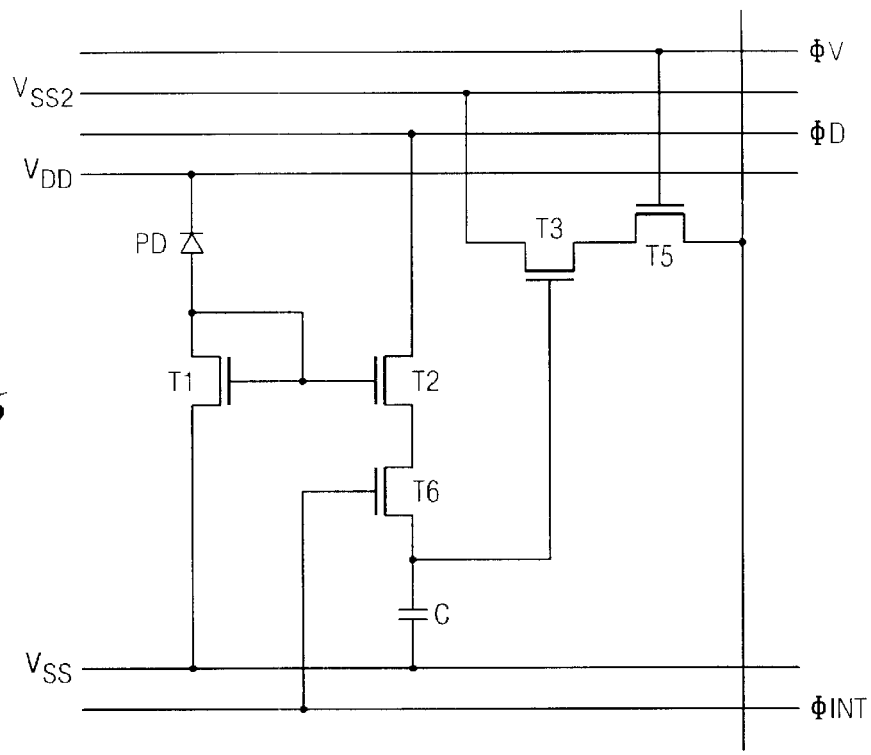
FIG. 6 is a circuit diagram showing the structure of each pixel according to a fourth embodiment of the present invention.

As shown in FIG. 6, a fourth embodiment is different from the first embodiment (FIG. 3) in that the fourth MOS transistor T4 is not provided, the clock ΦD is supplied to the drain of the second MOS transistor T2, and the sixth MOS transistor T6 is interposed as a switch between the source of the second MOS transistor and the capacitor C. As for the other components, they are the same as in the first embodiment. The sixth MOS transistor T6 has the drain connected to the source of the second MOS transistor T2, a source connected to the capacitor, and the gate to which the integration-time control voltage ΦINT is applied.

When the photodiode PD is irradiated with light, a photoelectric current is generated and a voltage having a value obtained by logarithmically converting the photoelectric current is generated at the gate of the MOS transistor T1 in accordance with the subthreshold characteristic of the MOS transistor. As a result of this voltage, a charge equivalent to a value obtained by logarithmically converting the integral of the photoelecttic current is accumulated in the capacitor C. Like the previous embodiment, if the integration-time control voltage ΦINT is supplied simultaneously for an equal period to the gate of the sixth MOS transistor T6 of each of the pixels arranged in two dimensions, the charges simultaneously accumulated in the capacitors C of the individual pixels can be integrated for equal periods.

When the pulse ΦV is supplied to the gate of the fifth MOS transistor T5 to turn the MOS transistor T5 ON, a voltage proportional to the charges (dependent on the quantity of charges in the capacitor C) accumulated at the gate of the third MOS transistor T3 is allowed to pass through the third and fifth MOS transistors T3 and T5, while being amplified by the third MOS transistor T3, and led out onto the output signal line 6, whereby a signal proportional to the logarithm of the quantity of incident light is read out. After the reading of the signal, the voltage on the capacitor C and the gate voltage of the third MOS transistor T3 can be initialized by turning OFF the fifth MOS transistor T5 and turning ON the sixth MOS transistor T6, and supplying the clock ΦD on the LOW level to the drain of the second MOS transistor for initializing the capacitor C.

Fifth Embodiment

Figure 7:
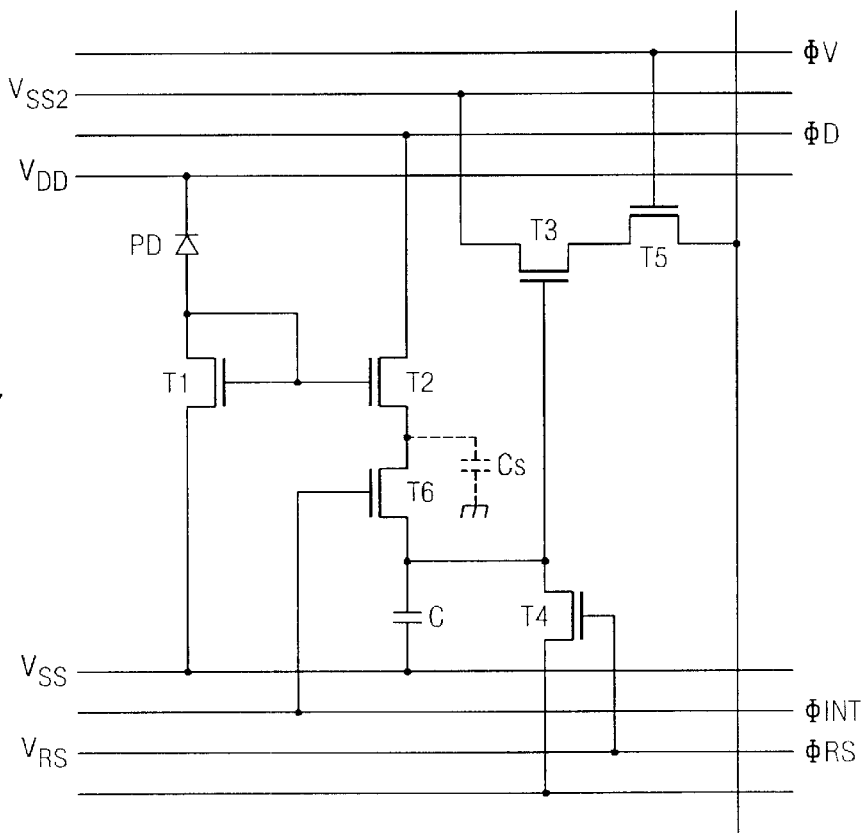
FIG. 7 is a circuit diagram showing the structure of each pixel according to a fifth embodiment of the present invention.

As shown in FIG. 7, the fifth embodiment is primarily different from the third embodiment (FIG. 5) in that the clock ΦD is supplied to the drain of the second MOS transistor T2 and the sixth MOS transistor T6 is interposed as a switch between the source of the second MOS transistor and the capacitor C. In the drawing, Cs denotes a pn junction capacitance related to the source of the second MOS transistor T2 (the drain of the sixth MOS transistor T6).

Figure 12:
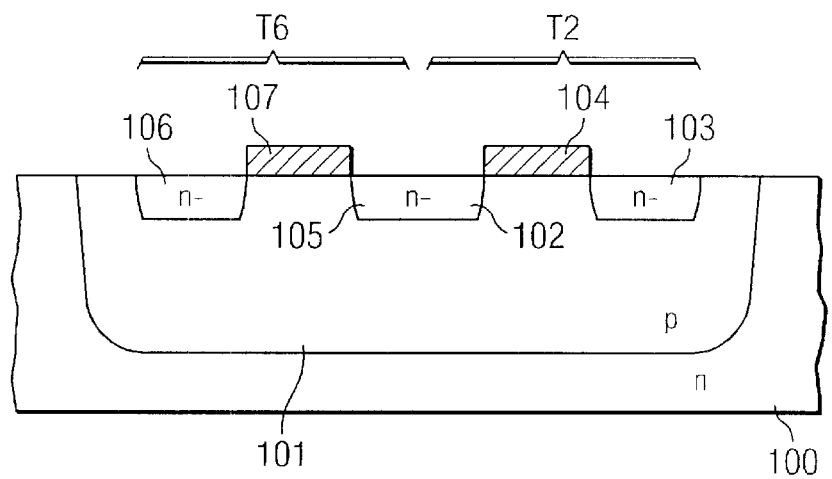
FIG. 12 shows the structure of a junction capacitance according to the fifth embodiment.

As shown in FIG. 12, the junction capacitance Cs is formed between the P-well layer 101 and the source region 102 of the second MOS transistor T2, each of which are formed in an n-type semiconductor substrate 100. It is to be noted that the source region 102 also serves as the drain region 105 of the sixth MOS transistor T6. In the drawing, a reference numeral 103 denotes the drain region of the second MOS transistor T2, a reference numeral 106 denotes the source region of the sixth MOS transistor T6, reference numerals 104 and 107 denote the respective gate electrodes of the second and sixth MOS transistors T2 and T6.

When the photodiode PD is irradiated with light, a photoelectric current is generated and a voltage having a value obtained by logarithmically converting the photoelectric current is generated at the gate of the first MOS transistor T1 in accordance with the subthreshold characteristic of the MOS transistor. As a result of this voltage, a charge equivalent to a value obtained by logarithmically converting the integral of the photoelectric current is accumulated in the capacitor C. If the integration-time control voltage ΦINT is supplied simultaneously for an equal period to the gate of the sixth MOS transistor T6 of each of the pixels arranged in two dimensions, the charges simultaneously accumulated in the capacitors C of the individual pixels can be integrated for equal periods.

When the pulse ΦV is supplied to the gate of the fifth MOS transistor T5 to turn the MOS transistor T5 ON, a voltage proportional to the charges accumulated at the gate of the third MOS transistor T3 is allowed to pass through the third and fifth MOS transistors T3 and T5, while being amplified by the third MOS transistor T3, and led out onto the output signal line 6, whereby a signal proportional to the logarithm of the quantity of incident light is read out. At the completion of integration in each of the pixels (i.e., after the sixth MOS transistor T6 is turned OFF), a LOW level clock ΦD signal is supplied to the drain of the second MOS transistor T2 to initialize the source of the second MOS transistor (the drain of the sixth MOS transistor), i.e., to initialize (reset) the junction capacitance Cs. After the LOW level clock ΦD signal is supplied to the drain of the second MOS transistor T2, and while sixth MOS transistor T6 is still OFF, integration of the signal from the photodiode occurs in the junction capacitance Cs. The signal integration in the pn junction capacitance Cs is initiated at the time when the clock ΦD shifts from the LOW level to the HIGH level. As a result of integrating the signal in the junction capacitance Cs, the signal from the photodiode may continue to be accumulated even during the time that the signal accumulated in the capacitor C is being read out.

After signals from all the pixels (signals for the current frame) are read out, the fourth MOS transistor T4 is turned ON to initialize the voltage on the capacitor C and the gate voltage of the third MOS transistor T3. Then, the fourth MOS transistor T4 is turned OFF and the sixth MOS transistor T6 is turned ON, at which point the charge accumulated in the junction capacitance Cs is transferred to the capacitor C. After the charge accumulated in the junction capacitance Cs is transferred to the capacitor C, the signal from the photodiode continues to integrate in the capacitor C. Thus, this configuration provides the function of performing simultaneous integration for an equal period and compatibility with a dynamic picture. In particular, the exposure time can be reduced by performing a part of integration (integration in the junction capacitance Cs) in parallel with the read operation, which enables the shooting of a dynamic picture at a TV rate. It is also to be noted that the source of the fourth MOS transistor T4 is connected to the reset voltage VRS.

Sixth Embodiment

Figure 8:
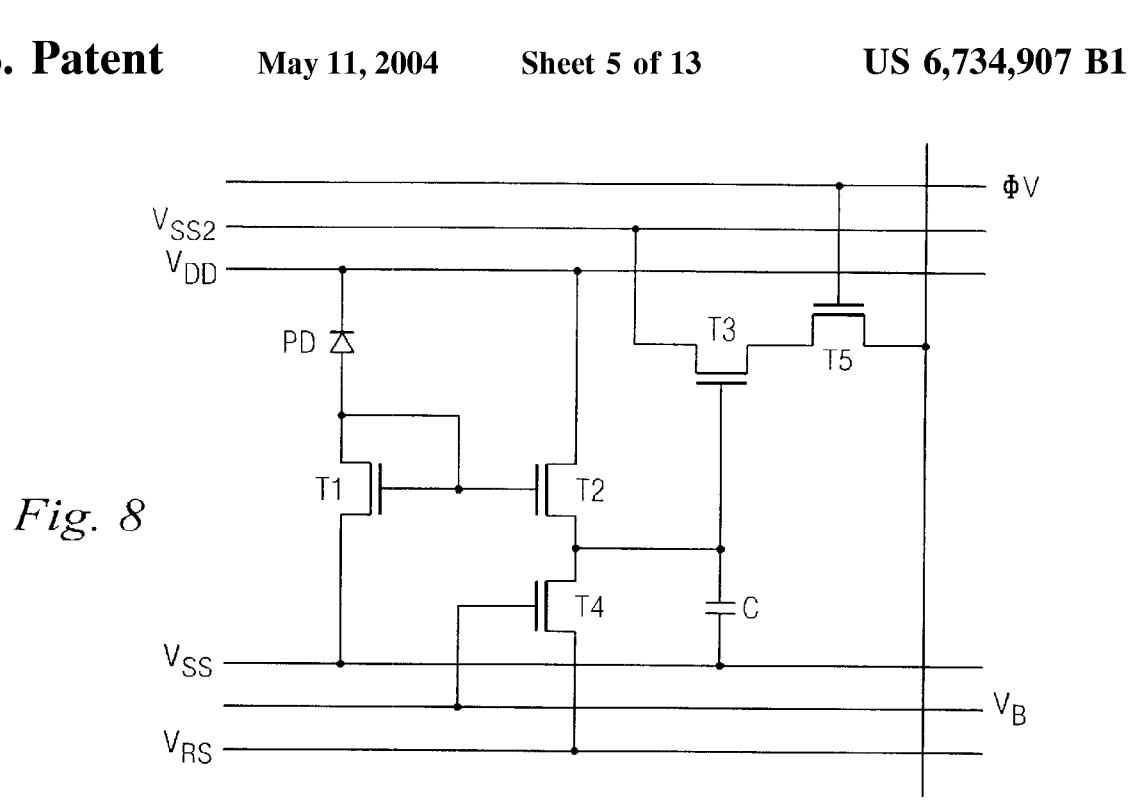
FIG. 8 is a circuit diagram showing the structure of each pixel according to a sixth embodiment of the present invention.

As shown in FIG. 8, a sixth embodiment is different from the first embodiment (FIG. 3) in that a specified direct-current voltage VB is constantly applied as the reset voltage to the gate of the fourth MOS transistor T4. The other components are the same as in the first embodiment. In the present embodiment, the fourth MOS transistor T4 constantly in the ON state becomes equivalent to a resistor so that the resistor having a specified value is connected to the capacitor. Consequently, the initial value of the capacitor is determined by the resistor. In other words, the initial value can be adjusted by varying the direct-current voltage applied to the gate electrode of the fourth MOS transistor T4.

Seventh Embodiment

Figure 9:
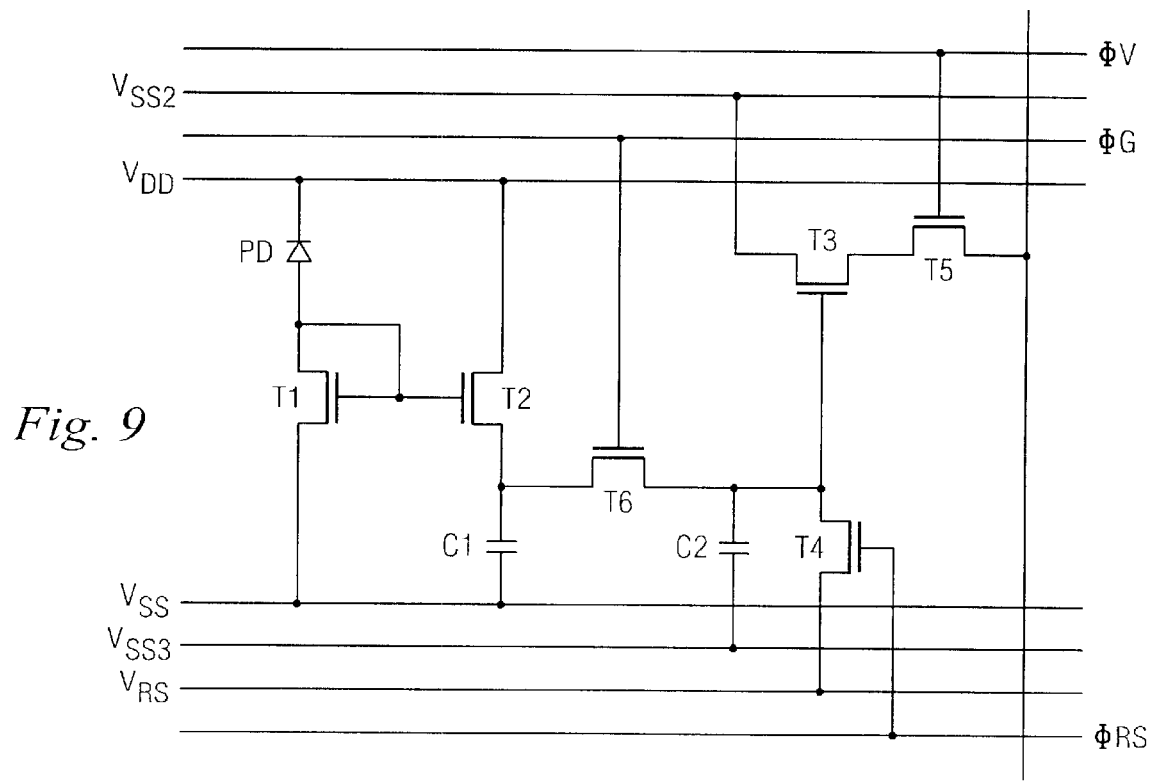
FIG. 9 is a circuit diagram showing the structure of each pixel according to a seventh embodiment of the present invention.

As shown in FIG. 9, a seventh embodiment is different from the first embodiment (FIG. 3) in that two capacitors C1 and C2 are provided as the capacitor and the sixth MOS transistor T6, composed of an n-channel MOS transistor, is connected as a switch between the two capacitors C1 and C2. The other components are the same as in the first embodiment. As shown in FIG. 9, the first capacitor C1 is connected between the source of the second MOS transistor T2 and the direct-current voltage Vss. The sixth MOS transistor T6, as a switch, has the drain connected to one terminal of the first capacitor C1 and to the source of the second MOS transistor T2. The second capacitor C2 is connected between the source of the sixth MOS transistor T6 and a direct-current voltage Vss3. The third MOS transistor T3 has the gate connected to the second capacitor C2 and to the source of the sixth MOS transistor T6.

When the photodiode PD is irradiated with light, a photoelectric current is generated and a voltage having a value obtained by logarithmically converting the photoelectric current is generated at the gate of the first MOS transistor T1 in accordance with the subthreshold characteristics of the MOS transistor. As a result of the voltage, a charge equivalent to a value obtained by logarithmically converting the integral of the photoelectric current is accumulated in the first capacitor C1. Then, a pulse ΦG is applied to the gate of the sixth MOS transistor T6 to turn the sixth MOS transistor T6 ON so that the charge integrated in the first capacitor C1 is transferred to the second capacitor C2. If the second capacitor C2 selected has a capacitance sufficiently large compared with that of the first capacitor C1, the majority of the charge in the first capacitor C1 is transferred to the second capacitor C2. By transferring the majority of the charge from the first capacitor C1 to the second capacitor C2, capacitor C1 is substantially reset. After the transfer of the charges to the second capacitor C2, integration of the signal from the photodiode is continued in the capacitors.

Next, the sixth MOS transistor is turned OFF and the pulse ΦV is supplied to the gate of the fifth MOS transistor T5 to turn the fifth MOS transistor T5 ON, whereby a voltage proportional to the charge in the second capacitor C2 (i.e, dependent on the quantity of charge accumulated in the second capacitor C2) at the gate of the third MOS transistor T3 is led out onto the output signal line 6 through the third and fifth MOS transistors T3 and T5. This allows an output voltage proportional to the logarithm of the quantity of incident light to be read out after being subjected to voltage amplification performed in the third MOS transistor T3. After the reading of the signal, the voltage on the second capacitor C2 and the gate voltage of the MOS transistor T3 can be initialized by turning OFF the fifth MOS transistor T5 and turning ON the fourth MOS transistor T4. In the present embodiment, the timing for integration (i.e., an integration time) for each of the pixels can be equalized by equally controlling the sixth MOS transistor T6 of each of the pixels.

Eighth Embodiment

Figure 10:
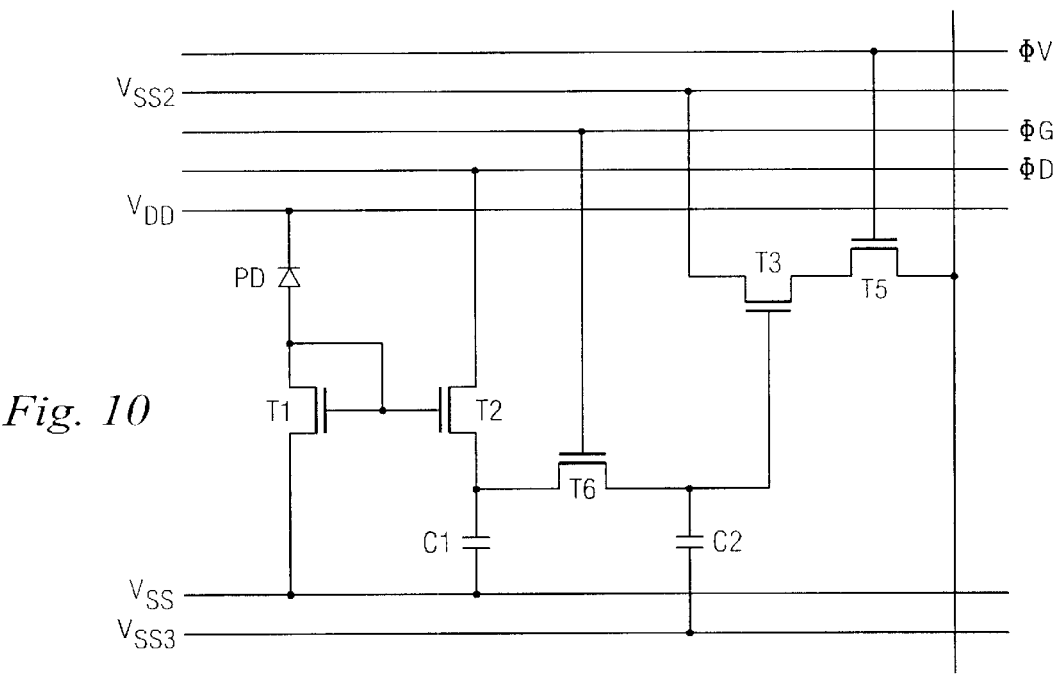
FIG. 10 is a circuit diagram showing the structure of each pixel according to an eighth embodiment of the present invention.

As shown in FIG. 10, an eighth embodiment is different from the seventh embodiment (FIG. 9) only in that the clock ΦD is applied to the drain of the second MOS transistor T2 and the absence of the fourth MOS transistor T4. The other components and connecting relations are the same as in the seventh embodiment. In the present embodiment, the integration in the first capacitor C1, the transfer of the integrated charges to the second capacitor C2, and the reading of the content of the second capacitor C2 are performed in the same manner as in the seventh embodiment.

In resetting the capacitor C2 after reading the signal is completed, a LOW level clock ΦD signal is supplied to the drain of the second MOS transistor T2, while the sixth MOS transistor T6 is in the ON state, whereby charges are released from the first capacitor C1 through the second MOS transistor T2, while charges are released from the second capacitor C2 through the sixth and second MOS transistors T6 and T2. As a result, the first and second capacitors C1 and C2 are simultaneously placed at the Low-level voltage of the clock ΦD (initialization).

Ninth Embodiment

Figure 11:
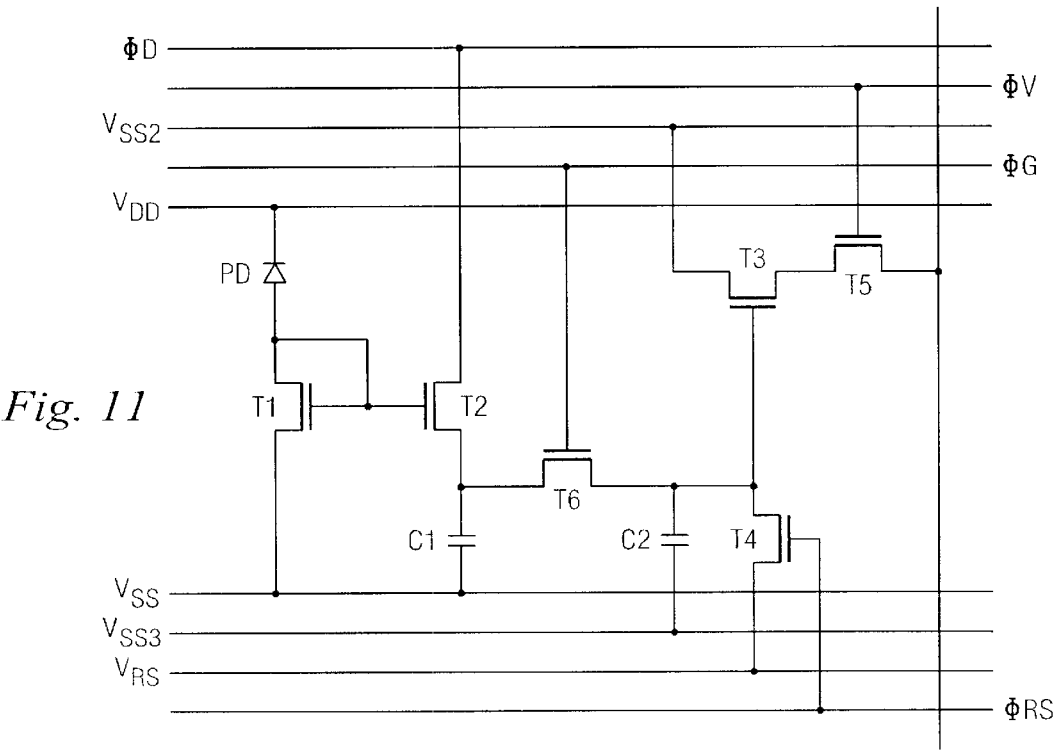
FIG. 11 is a circuit diagram showing the structure of each pixel according to a ninth embodiment of the present invention.

As shown in FIG. 11, a ninth embodiment is different from the seventh embodiment (FIG. 9) only in that rather than a direct-current voltage, but instead a clock ΦD is applied to the drain of the second MOS transistor T2. The other components are the same as in the seventh embodiment. In the present embodiment, the resetting (initialization) of the first capacitor C1 is performed independently of the resetting (initialization) of the second capacitor C2. Specifically, the resetting of the first capacitor C1 is performed by applying the clock ΦD at the Low-level voltage to the drain of the second MOS transistor T2, while the resetting of the second capacitor C2 is performed by turning ON the fourth MOS transistor T4.

When the photodiode PD is irradiated with light, a photoelectric current is generated and a voltage having a value obtained by logarithmically converting the photoelectric current is generated at the gate of the first MOS transistor T1 in accordance with the subthreshold characteristic of the MOS transistor. As a result of this voltage, a charge equivalent to a value obtained by logarithmically converting the integral of the photoelectric current is accumulated in the first capacitor C1. Consequently, if a LOW level clock ΦD signal is supplied simultaneously for an equal period to the drain of the second MOS transistor T2 of each of the pixels to initiate integration in the capacitor C1, and then the sixth MOS transistor T6 of each of the pixels is turned ON, bulk of the charge integrated in the first capacitor C1 is transferred to the second capacitor C2. If the pulse is supplied simultaneously for an equal period to the gate of the sixth MOS transistor T6 of each of the pixels arranged in two dimensions to turn the respective sixth MOS transistors T6 ON, the charge integrated simultaneously in the second capacitors C2 of the individual pixels can be accumulated for equal periods.

Next, a pulse ΦV is supplied to the gate of the fifth MOS transistor to turn the fifth MOS transistor T5 ON, whereby a voltage proportional to the charge (dependent on the quantity of charge in the second capacitor C2) accumulated at the gate of the third MOS transistor T3 is allowed to pass through the third and fifth MOS transistors T3 and T5, while being voltage-amplified by the third MOS transistor T3, and led out onto the output signal line 6. In this manner, the voltage proportional to the logarithm of the quantity of incident light can be read out. At the completion of integration in each of the pixels (after the sixth MOS transistor T6 is turned OFF), a LOW level clock ΦD signal is supplied to the drain of the second MOS transistor T2 to initialize the first capacitor C1 so that the signal from the photodiode (for a subsequent frame) can be accumulated in the first capacitor C1 even during the period where the signal is being read out of capacitor C2.

After the signals for all the pixels are read out, the fourth MOS transistor T4 is turned ON to initialize the voltage on the second capacitor C2 and the gate voltage of the third MOS transistor T3. Subsequently, the sixth MOS transistor T6 is turned ON to transfer the charge accumulated in the first capacitor C1 to the second capacitor C2 and thereby continue the integration. This provides the function of performing simultaneous integration for an equal period and compatibility with a dynamic picture.

Figure 15:
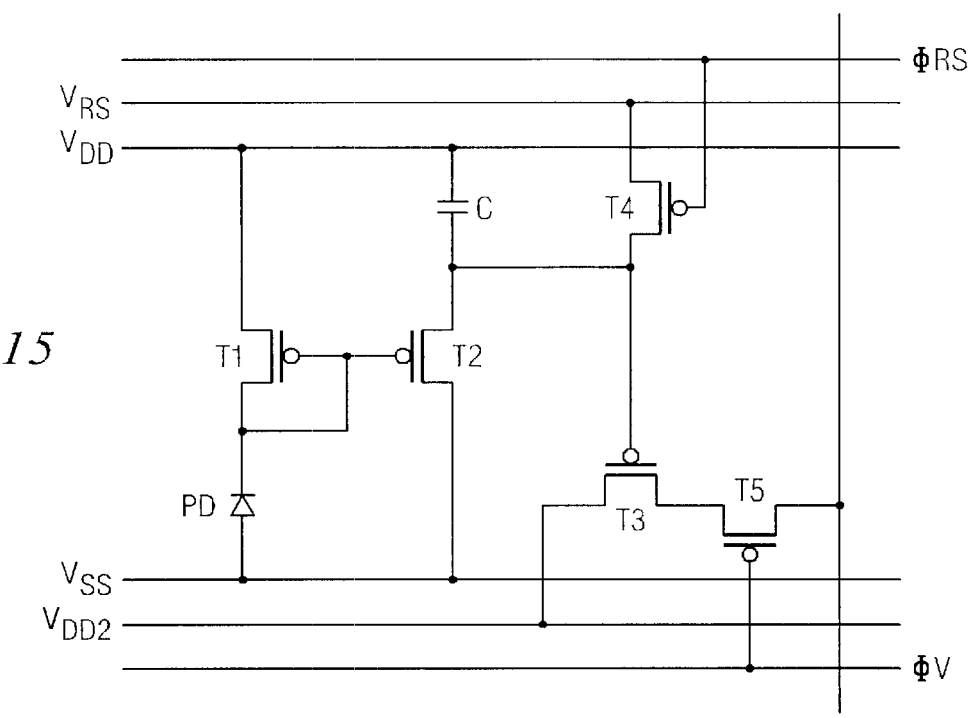
FIG. 15 is a circuit diagram showing the structure of each pixel according to a tenth embodiment of the present invention.
Figure 16:
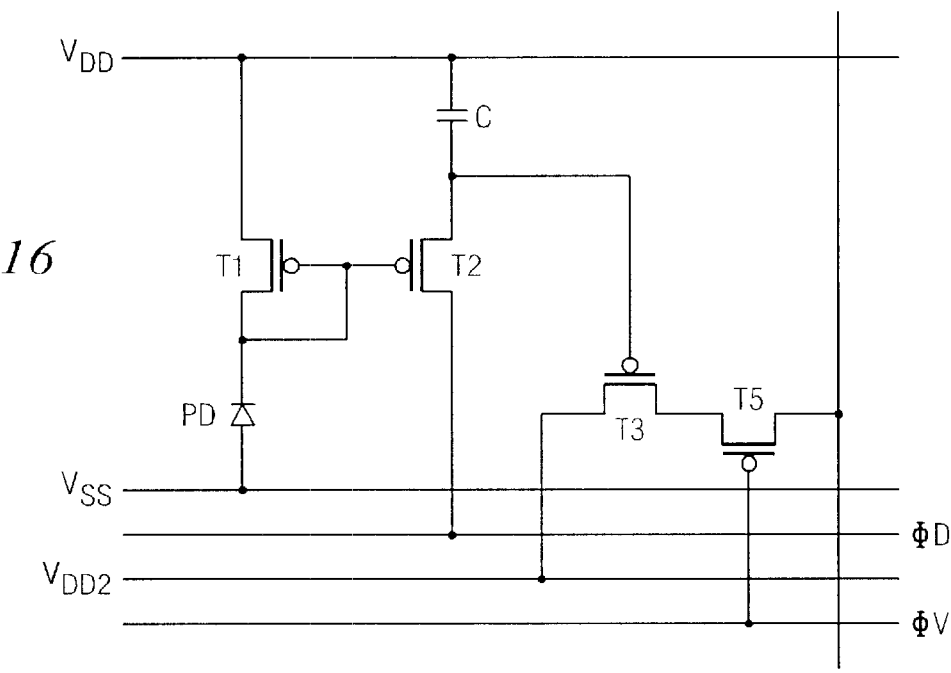
FIG. 16 is a circuit diagram showing the structure of each pixel according to an eleventh embodiment of the present invention.
Figure 17:
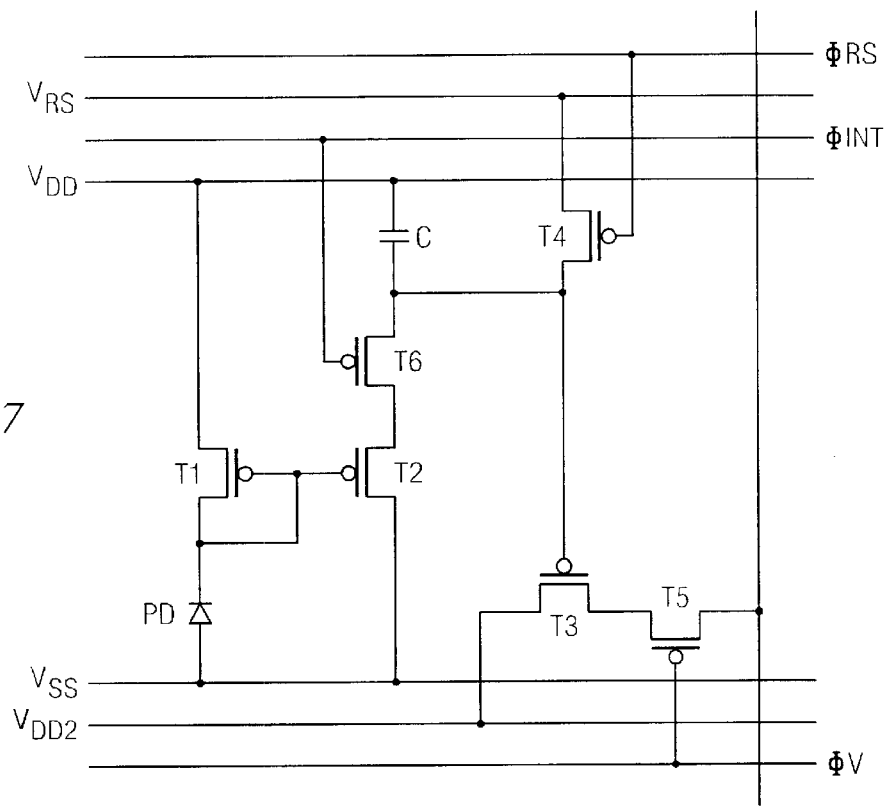
FIG. 17 is a circuit diagram showing the structure of each pixel according to a twelfth embodiment of the present invention.
Figure 18:
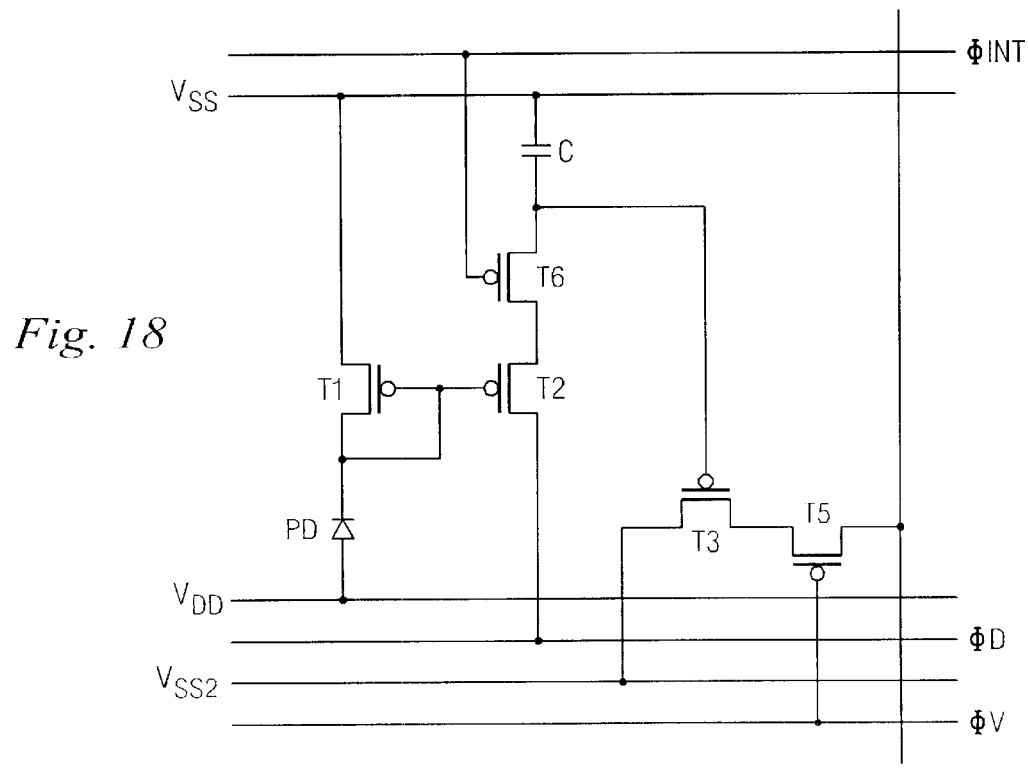
FIG. 18 is a circuit diagram showing the structure of each pixel according to a thirteenth embodiment of the present invention.
Figure 19:
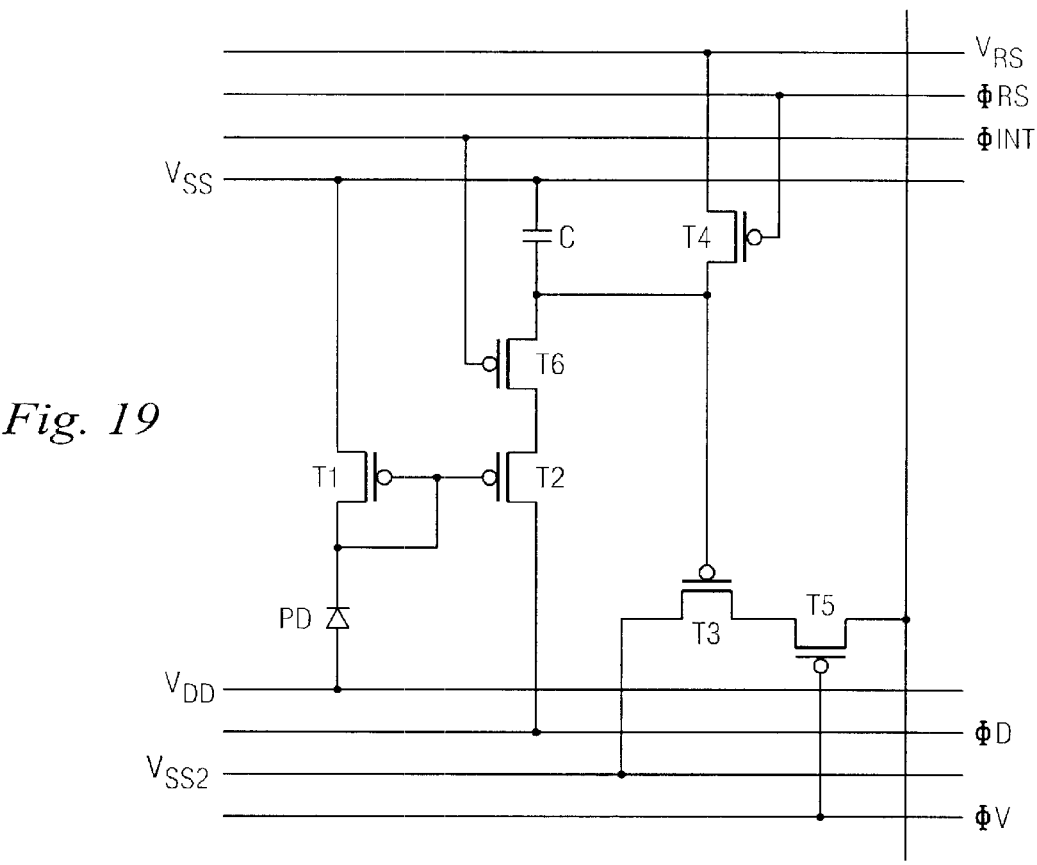
FIG. 19 is a circuit diagram showing the structure of each pixel according to a fourteenth embodiment of the present invention.
Figure 20:
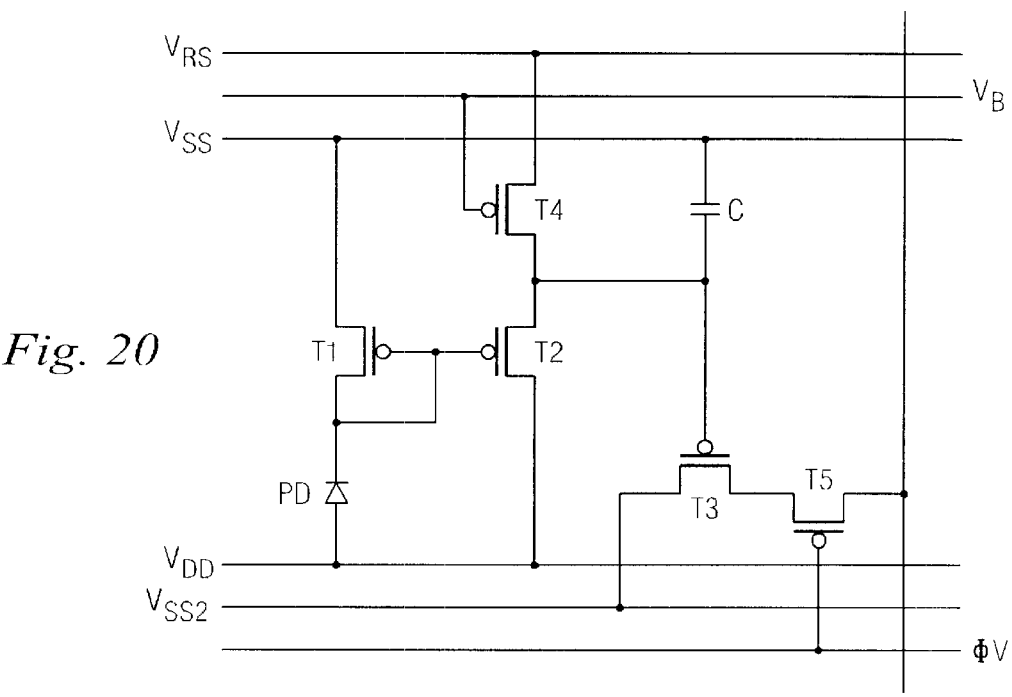
FIG. 20 is a circuit diagram showing the structure of each pixel according to a fifteenth embodiment of the present invention.
Figure 21:
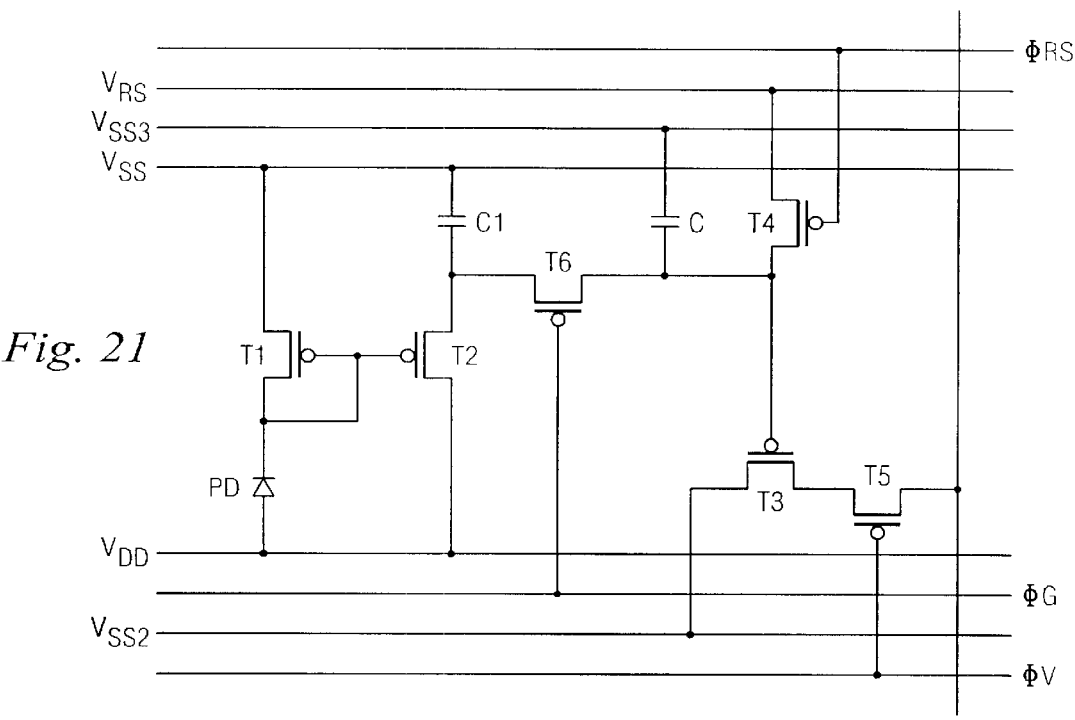
FIG. 21 is a circuit diagram showing the structure of each pixel according to a sixteenth embodiment of the present invention.
Figure 22:
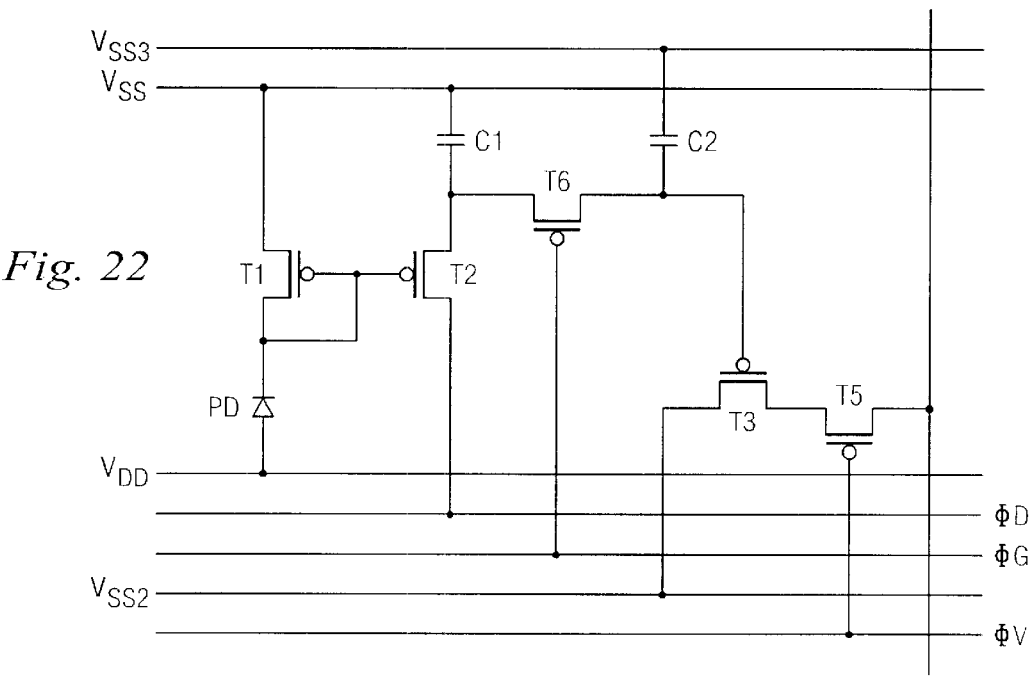
FIG. 22 is a circuit diagram showing the structure of each pixel according to a seventeenth embodiment of the present invention.
Figure 23:
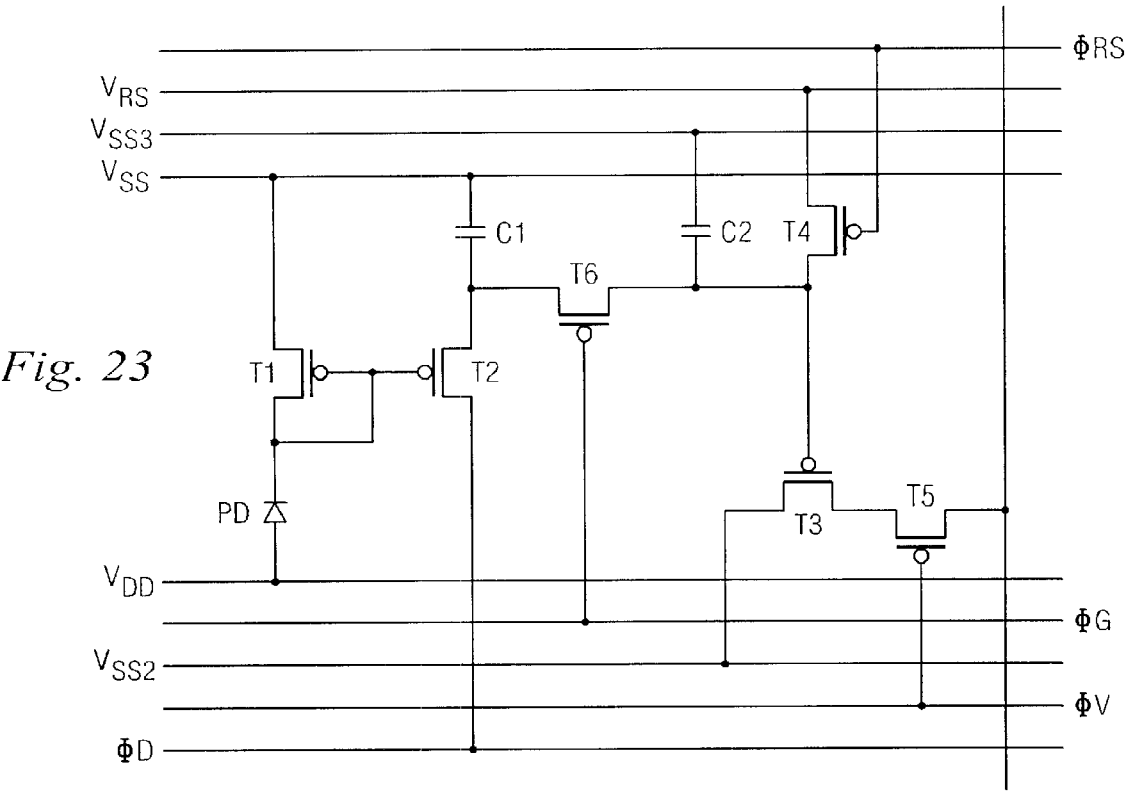
FIG. 23 is a circuit diagram showing the structure of each pixel according to an eighteenth embodiment of the present invention.
Figure 24:
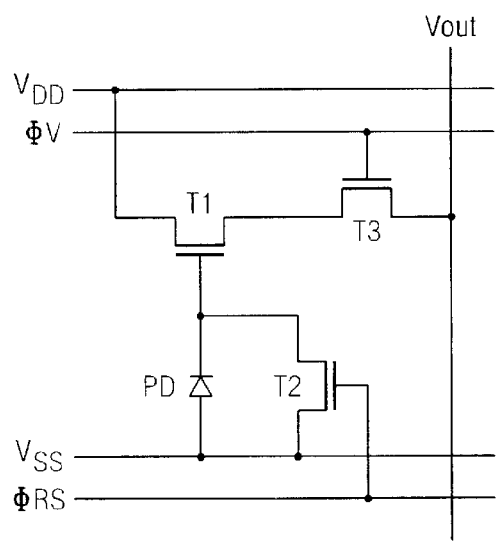
FIG. 24 is a circuit diagram showing the structure of each pixel according to a conventional embodiment.

Although the MOS transistors T1 to T6, which are active elements in the pixels, are each composed of an n-channel MOS transistor in the first to ninth embodiments described above, the MOS transistors may also be composed of p-channel MOS transistors. FIGS. 15 to 23 show tenth to eighteenth embodiments in which each of the MOS transistors T1 to T6 is composed of a p-channel MOS transistor. Accordingly, connecting relations and the polarity of an applied voltage are reversed in FIGS. 15 to 23 relative to FIGS. 3 to 11. In FIG. 15, for example, the photodiode PD has the anode connected to the direct-current voltage Vss and the cathode connected to the drain and gate of the first MOS transistor T1 and to the gate of the second MOS transistor. On the other hand, the first MOS transistor has the source connected to the direct-current voltage VDD.

In this case, the relationship between the direct-current voltages Vss and Vdd is expressed as Vss<VDD, which is reverse to the relationship shown in FIG. 3 (Embodiment 1). An output voltage from the capacitor C has a high initial value, which is lowered by integration. When the fourth and fifth MOS transistors T4 and T5 are turned ON, a low voltage is applied to the gates thereof. On the other hand, a power-source voltage VDD2 is applied to the source of the third MOS transistor T3. As stated above, although voltages and connecting relations are partially different in the case of using the p-channel MOS transistors from the case of using the n-channel MOS transistors, the structure is substantially the same and the basic operation is the same, so that the structure and operation are only shown by FIGS. 15 to 23 and a further description thereof is unnecessary and is thus omitted.

Figure 13:
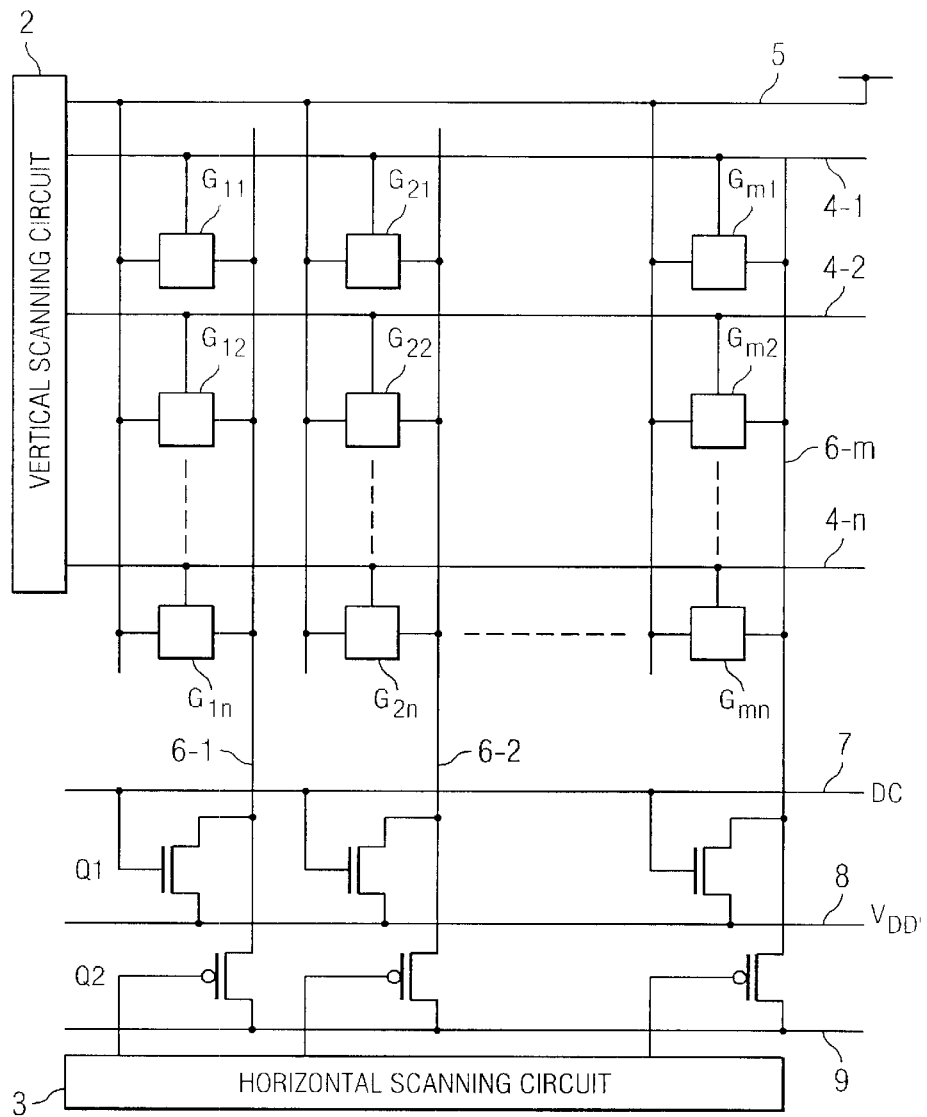
FIG. 13 is a block diagram for illustrating the entire structure of a two-dimensional solid-state image pickup device according to an embodiment of the present invention in which an active element in each pixel is composed of a p-channel MOS transistor.
Figure 14:
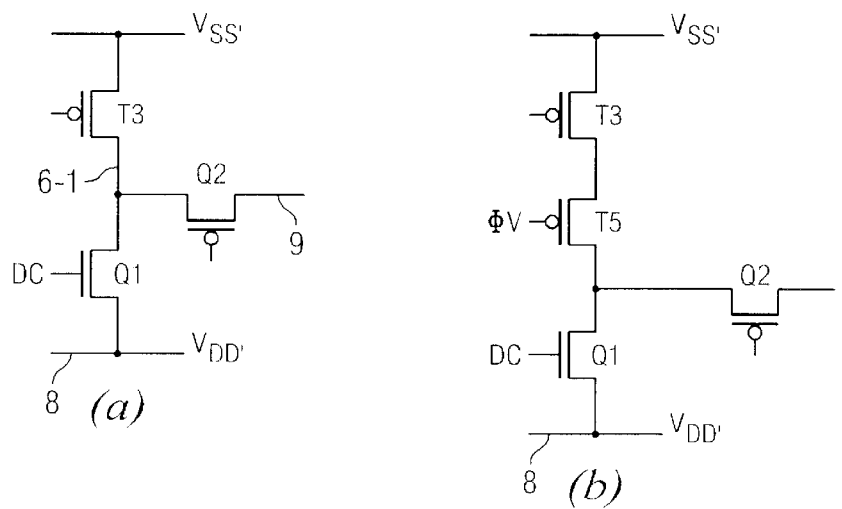
FIGS. 14(a) and (b) are circuit diagrams each showing a part of the image pickup device of FIG. 13.

FIG. 13 is a block circuit diagram for illustrating the entire structure of a solid-state image pickup device comprising pixels according to the tenth to eighteenth embodiments. FIG. 14 shows the portion of a voltage amplifier circuit extracted from the image pickup device shown in FIG. 13. The description of the common components shown in FIGS. 13 and 1 will be omitted by providing the same reference numerals. As shown in FIG. 13, an n-channel MOS transistor Q1 and a p-channel MOS transistor Q2 are connected to each of the output signal lines 6-1, 6-2, ... 6-m which are arranged in rows. The MOS transistor Q1 has the gate connected to the direct-current voltage line 7, the drain connected to the output signal line 6-1 and the source connected to the direct-current power-source line 8. On the other hand, the MOS transistor Q2 has the drain connected to the output signal line 6-1, the source connected to the final signal line 9 and the gate connected to the horizontal scanning circuit. The transistor Q1 and the p-channel third MOS transistor T3 in each of the pixels constitute a source-grounded voltage amplifier circuit as shown in FIG. 14(a).

In this case, the MOS transistor Q1 serves as a load resistor to the third MOS transistor T3. Consequently, the relationship between a direct-current voltage VDD' connected to the source of the transistor Q1 and a direct-current voltage VSS' connected to the source of the third MOS transistor T3 is expressed as VDD'<VSS'. The direct-current voltage VDD' is, e.g., the ground voltage (grounding). The MOS transistor Q1 has the drain connected to a transistor T3 and the gate to which a direct-current voltage is applied. The p-channel MOS transistor Q2 is controlled by the horizontal scanning circuit 3 and leads out an output from the amplifier circuit onto the final output line 9. If attention is focused on the fifth MOS transistor T5 in each of the pixels, the circuit shown in FIG. 14(a) is depicted as in FIG. 14(b).

As stated previously, since a high signal voltage is obtained from each of the pixels according to the present invention, the processing of the signal in the subsequent circuit is facilitated. Moreover, since integration is performed in the capacitor, the variable component and noise component of light from the light source can be removed. In addition, voltage amplification for increasing the magnitude of a signal as desired, provides a high-quality image pickup signal with an improved S/N ratio. On the other hand, logarithmic conversion of a photoelectric current provides an enlarged dynamic range. Furthermore, the active elements composed of the MOS transistors can be formed on a single chip in conjunction with peripheral processing circuits (including an A/D converter, a digital system processor, and a memory), which contributes to the implementation of, e.g., a one-chip camera.

Although the present invention has been fully described by way of examples and with reference to the accompanying drawings, it is to be understood that various changes and modifications will be apparent to those skilled in the art without departing from the spirit and scope of the invention. Therefore, unless such changes and modifications depart from the scope of the present invention, they should be construed as being included therein.

What is claimed is:

1. An image pickup device having a plurality of pixels, each of said pixels comprising:
    a photoelectric converting device;
    an integrating circuit for integrating an output signal from said photoelectric converting device to generate a voltage;
    an amplifier for amplifying said voltage from said integrating circuit; and
    a lead-out path for leading out said amplified voltage onto an output signal line,
    wherein said amplifier includes an amplifier transistor having a first electrode, a second electrode, and a control electrode, said integrating circuit being connected to said control electrode, said second electrode being connected to said output signal line, and
    wherein said photoelectric converting device includes a photodiode which generates a photocurrent proportional to incident light and a logarithmic converter which generates said output signal based on said photocurrent, said output signal being a voltage proportional to the logarithm of said photocurrent.

2. An image pickup device in accordance with claim 1, wherein said image pickup device includes a plurality of output signal lines and at least a portion of said plurality of pixels are connected to each of said output signal lines, each output signal line having a load resistor connected between said output signal line and a voltage source line.

3. An image pickup device in accordance with claim 2, wherein said load resistor is a resistor transistor having a first electrode connected to a respective one of said output signal lines, a second electrode for connection to a first direct-current voltage via said voltage source line, and a control electrode for connection to a direct-current voltage.

4. The image pickup device according to claim 3, wherein said amplifier transistor is an n-channel MOS transistor having a first electrode for connection to a second direct-current voltage, said second direct-current voltage being lower in potential than said first direct-current voltage.

5. The image pickup device according to claim 3, wherein said amplifier transistor is a p-channel MOS transistor having a first electrode for connection to a second direct-current voltage, said second direct-current voltage being higher in potential than said first direct-current voltage.

6. An image pickup device in accordance with claim 1, further comprising a first switching device connected between said photoelectric converting device and said integrating circuit for selectably communicating said output signal to said integrating circuit.

7. An image pickup device in accordance with claim 6, further comprising an integrating circuit resetting device for selectably resetting a voltage in said integrating circuit.

8. An image pickup device in accordance with claim 7, further comprising a second switching device connected between said amplifier and said output signal line for selectably communicating said amplified voltage out onto said output signal line.

9. An image pickup device in accordance with claim 8, wherein said logarithmic converter comprises first and second MOS transistors each of which includes first and second electrodes and a control electrode, said photodiode being connected to said first electrode and to said control electrode of said first MOS transistor, said control electrode of said first MOS transistor being connected to said control electrode of said second MOS transistor, said integrating circuit being connected to said second electrode of said second MOS transistor.

10. An image pickup device in accordance with claim 9, wherein each of said amplifier transistor, said first and second MOS transistors, said first switching device and said second switching device are n-channel MOS transistors.

11. An image pickup device in accordance with claim 9, wherein each of said amplifier transistor, said first and second MOS transistors, said first switching device and said second switching device are p-channel MOS transistors.

12. An image pickup device having a plurality of pixels, each of said pixels comprising:

a photoelectric converting device;

an integrating circuit for integrating an output signal from said photoelectric converting device to generate a voltage;

an amplifier for amplifying said voltage from said integrating circuit; and a lead-out path for leading out said amplified voltage onto an output signal line, wherein said integrating circuit includes:

a first capacitor having one terminal connected to said photoelectric converting device;

a second capacitor having one terminal of said second capacitor being connected to said amplifier;

a capacitor switching device disposed between said first capacitor and said second capacitor for switchably coupling one terminal of said first capacitor with said one terminal of said second capacitor so that both of said first and second capacitors can integrate said output signal from said photoelectric converting device when said capacitor switching device is in a closed position and only said first capacitor can integrate said output signal from said photoelectric converting device when said capacitor switching device is in an open position, said one terminal of said second capacitor being connected to said amplifier even when said capacitor switching device is in an open position.

13. An image pickup device in accordance with claim 12, further comprising an integrating circuit resetting device for selectably resetting a voltage in said integrating circuit.

14. An image pickup device in accordance with claim 1, wherein said integrating circuit includes:

a transistor having a first electrode, a second electrode, and a control electrode, said control electrode being connected to said logarithmic converter to receive said converted voltage; and a capacitor having one terminal connected to said second electrode of said transistor to generate a second voltage based on an output of said transistor.

15. An image pickup device in accordance with claim 14, wherein said integrating circuit further comprises a switch connected between said transistor and said capacitor for selectably communicating an output from said transistor to said capacitor so that accumulation of said second voltage in said capacitor may be controlled thereby.

16. An image pickup device in accordance with claim 15, wherein said transistor has a pn junction capacitance and is adapted to accumulate a charge based on an output of said logarithmic converter when said switch is in an open position.

17. An image pickup device in accordance with claim 1, wherein said integrating circuit includes:

a first transistor having a first electrode, a second electrode, and a control electrode, said control electrode begin connected to said logarithmic converter to receive said converted voltage;

a first capacitor, one terminal of said first capacitor being connected to said second electrode of said first transistor to receive an output from said first transistor, a second capacitor, one terminal of said second capacitor being connected to said second electrode of said first transistor via a switch so that said first capacitor generates a second voltage based on an output of said transistor when said switch is in an open position and said first capacitor and said second capacitor together generate said second voltage when said switch is in a closed position.

18. An image pickup device in accordance with claim 3, wherein a number of said load resistors is smaller than a number of said plurality of pixels.

* * * * *